(12) United States Patent
Reeves

(10) Patent No.: US 9,100,324 B2
(45) Date of Patent: Aug. 4, 2015

(54) NETWORK PROTOCOL ANALYZER APPARATUS AND METHOD

(75) Inventor: Randall E. Reeves, Farmington Hills, MI (US)

(73) Assignee: Secure Crossing Research & Development, Inc., Dearborn, MI (US)

( * ) Notice: Subject to any disclaimer, the term of this patent is extended or adjusted under 35 U.S.C. 154(b) by 702 days.

(21) Appl. No.: 13/275,829

(22) Filed: Oct. 18, 2011

(65) Prior Publication Data

US 2013/0094376 A1    Apr. 18, 2013

(51) Int. Cl.
*H04L 12/56* (2006.01)
*H04L 12/26* (2006.01)
*H04L 29/06* (2006.01)

(52) U.S. Cl.
CPC ............ *H04L 43/18* (2013.01); *H04L 63/0245* (2013.01); *H04L 63/1408* (2013.01); *H04L 63/1441* (2013.01)

(58) Field of Classification Search
USPC ........................................................ 370/252
See application file for complete search history.

(56) References Cited

U.S. PATENT DOCUMENTS

| | | |
|---|---|---|
| 5,086,426 A | 2/1992 | Tsukakoshi et al. |
| 5,473,607 A | 12/1995 | Hausman et al. |
| 5,550,816 A | 8/1996 | Hardwick et al. |
| 5,623,605 A | 4/1997 | Keshav et al. |
| 5,805,810 A | 9/1998 | Maxwell |
| 5,987,611 A | 11/1999 | Freund |
| 6,141,755 A | 10/2000 | Dowd et al. |
| 6,219,706 B1 | 4/2001 | Fan et al. |
| 6,219,786 B1 | 4/2001 | Cunningham et al. |
| 6,356,942 B1 | 3/2002 | Bengtsson et al. |
| 7,028,335 B1 | 4/2006 | Borella et al. |
| 7,080,399 B1 | 7/2006 | Yanagawa et al. |
| 7,185,360 B1 | 2/2007 | Anton, Jr. et al. |
| 7,200,144 B2 | 4/2007 | Terrell et al. |
| 7,313,141 B2 | 12/2007 | Kan et al. |
| 7,352,706 B2 | 4/2008 | Klotz et al. |
| 7,386,881 B2 | 6/2008 | Swander et al. |
| 7,401,120 B2 | 7/2008 | Walbeck et al. |

(Continued)

FOREIGN PATENT DOCUMENTS

| | | |
|---|---|---|
| WO | 0027086 | 5/2000 |
| WO | 0158069 | 8/2001 |

OTHER PUBLICATIONS http://modbusfw.sourceforge.net/; webpage attached as NPL document captured on Jan. 19, 2011; according to The Wayback Machine, the content was available at least as early as Jun. 9, 2004.

(Continued)

*Primary Examiner* — Dang Ton
*Assistant Examiner* — Pamit Kaur
(74) *Attorney, Agent, or Firm* — The Weintraub Group, P.L.C.

(57) ABSTRACT

In one embodiment, a method for electronically analyzing packets using a packet analyzing apparatus includes receiving one or more data packets via a first interface port, wherein the one or more data packets comprises a full packet that may include a payload, determining whether the full packet is part of an existing permitted connection, and if so, determining whether the full packet contains a payload, and if the full packet of the existing permitted connection does not contain a payload, transmitting data indicative of the full packet via the second interface port to an industrial machine control.

20 Claims, 23 Drawing Sheets

(56) References Cited

U.S. PATENT DOCUMENTS

| | | |
|---|---|---|
| 7,496,962 B2 | 2/2009 | Roelker et al. |
| 7,724,657 B2 | 5/2010 | Rao et al. |
| 7,730,521 B1 | 6/2010 | Thesayi et al. |
| 7,949,785 B2 | 5/2011 | Alkhatib et al. |
| 7,954,141 B2 | 5/2011 | De Lutiis et al. |
| 7,990,967 B2 | 8/2011 | Brandt et al. |
| 2003/0174718 A1 | 9/2003 | Sampath et al. |
| 2003/0191857 A1 | 10/2003 | Terrell et al. |
| 2003/0217289 A1 | 11/2003 | Ammon et al. |
| 2004/0131078 A1 | 7/2004 | Gupta et al. |
| 2005/0022010 A1 | 1/2005 | Swander et al. |
| 2005/0132034 A1 | 6/2005 | Iglesia et al. |
| 2006/0236374 A1 | 10/2006 | Hartman |
| 2006/0245454 A1 | 11/2006 | Balasubramanian et al. |
| 2006/0268732 A1 | 11/2006 | Smith |
| 2007/0016947 A1* | 1/2007 | Balissat et al. .................. 726/15 |
| 2007/0183421 A1 | 8/2007 | Terrell et al. |
| 2007/0186011 A1 | 8/2007 | Batke et al. |
| 2007/0189307 A1 | 8/2007 | Overby et al. |
| 2008/0008202 A1 | 1/2008 | Terrell et al. |
| 2008/0069009 A1 | 3/2008 | Zhang et al. |
| 2008/0282339 A1 | 11/2008 | Nakae et al. |
| 2009/0006841 A1* | 1/2009 | Ormazabal et al. ........... 713/152 |
| 2009/0126003 A1 | 5/2009 | Touboul |
| 2009/0210701 A1 | 8/2009 | Zhang et al. |
| 2010/0031340 A1 | 2/2010 | Batke et al. |
| 2010/0103837 A1 | 4/2010 | Jungck et al. |
| 2011/0238855 A1* | 9/2011 | Korsunsky et al. ........... 709/231 |

OTHER PUBLICATIONS

Retrieved from the Internet: http://citeseerx.ist.psu.edu/viewdoc/download?doi=10.1.1.45.624&rep=rep1&type=pdf.

* cited by examiner

NETWORK PROTOCOL ANALYZER APPARATUS AND METHOD

BACKGROUND OF THE INVENTION

The present invention is directed to methods and apparatus for analyzing communication protocols to prevent network intrusion.

Deep Packet Inspection (DPI) for anti-intrusion security combines the functionality of an Intrusion Detection System (IDS) and an Intrusion Prevention System (IPS) with a traditional stateful firewall. This combination makes it possible to detect certain attacks that neither the IDS/IPS nor the stateful firewall can catch on their own. However, stateful firewalls, which can detect the beginning and end of a packet flow, cannot, on their own, detect events that would be out of bounds for a particular application. While IDSs are able to detect intrusions, they have very little capability to block such an attack. DPIs can be used to prevent attacks from viruses and worms at wire speeds. More specifically, DPI can be effective against buffer overflow attacks, Denial of Service (DoS) attacks, sophisticated intrusions, and a small percentage of worms that fit within a single packet. However, a greater level of security control is required for complex industrial networks.

Intrusion Detection and Intrusion Prevention Systems (IDS/IPS) normally rely on signature comparisons such as the SNORT program maintained by Sourcefire. Most security vendors use some variation of this program modified for their specific product offering.

SNORT, an intrusion detection and intrusion prevention product, has been used in products that can interpret industrial protocols and do a signature-based comparison on a portion of a data stream. However, a problem arises because programs like SNORT do not convert the data stream into meaningful data. Rather, tests indicate that signature based systems are, at best, about 30% accurate in detecting attack vectors. The tests produced large numbers of false positives and false negatives. The present inventor believes that this inaccuracy is a result of the difficulty of accurately performing a bit set comparison against an industrial protocol.

At least one vendor, Digital Bond, is known to supply a product that compares a known signature to multiple packets that have been parsed and reassembled for comparison. However, some objects within, for example, CIP (Common Industrial Protocol) have multiple embedded objects, and thus cannot be properly analyzed by a signature comparison even with the use of protocol specific preprocessors. False positive and false negative detections of threats and intrusions occur in numbers that may be unacceptable in some industrial automation and critical infrastructure systems.

Industrial automation and critical infrastructure can include plant automation on the plant floor, pipeline, power plants, power distribution, water, waste water, formalized science manufacturing, food manufacturing and packaging, mining, minerals, and cement. All of these and others fall within the spectrum of industrial automation in critical infrastructure, so this list is not intended to be complete or all inclusive. The production of a physical product, or a tangible product like electricity, is also considered to fall within industrial automation and/or critical infrastructure. A common feature of this infrastructure is that, on the plant floor, programmable logic controllers (PLCs) control robots. Most of these PLCs can be held in one's hand and are typically programmed using ladder logic. PLCs can be programmed by industrial engineers.

There are many manufacturers, such as Alan Bradley, GE, Coryell, Emerson, ABB, Siemens, etc., that build these PLC controllers. In one plant, step one of a ladder logic program may be, for example, to raise a robot arm 17.2° in 1.3 seconds and then to rotate the hand 63° in 3.2 seconds. This logic cascades down, as control passes to a next logic controller, which, for example, may swing an entire robot assembly around. Additional logic controllers may perform other steps in sequence down an assembly line. Down the line further, another logic controller may write data to a logic controller in the assembly line to make that logic controller speed up or slow down due to the number of manufactured items coming through the assembly line. Other devices, such as process servers, control processes that are very high speed or which may utilize numerous variables. Other devices found on a plant floor can include HMIs, which are human-machine interfaces such as display screens that allow a process engineer to see that a process is running properly and to enter data to change something.

At one time, all process controllers ran on proprietary protocols. For example, some process controllers used a serial driven protocol with proprietary hardware. Thus, the controllers had unique electrical connectors that were proprietary to the individual manufacturers, and the whole control loop, including the process controllers, was completely isolated. Management need for efficiency and ERP data was handled by floor operators using manual paper and pencil techniques. However, these techniques became inadequate as real-time efficiency measurements, inventory numbers, and supplier delivery orders based on supplier lead times were desired. Furthermore, CEOs wanted to know why, for example, their company's plant in India operated at high efficiency except on Tuesdays while their plant in Malaysia operated in high efficiency except every fourth Wednesday of the month.

A solution to these data needs was to converge real-time data from different locations on to Ethernet. One such protocol is known as CIP, the common industrial protocol. Another such protocol is known as PROFINET. DNP3 is a master-slave serial protocol used predominantly in chemical plants, in power substations and in power plants. For example, a DNP3 protocol can be used to shut off or turn on breakers and/or motors.

At a higher level, the ICCP (inter control center protocol) is used to provide communication between electrical grids. Another protocol known as OPC is an open source standard interpretive language that can be used for communication between a plant floor and a database server. This language allows transformation of data sets between different protocols.

The use of such diverse protocols can lead to the vulnerability of industrial plants. For example, the Stuxnet worm, which many believe will be adapted from a vector spread by a USB key to possibly server side scripts or e-mail, and change protocol from, for example, PROFINET to CIP so that it is able to attack other types of controllers.

The security of critical infrastructure has become such a major concern that the NSA, the Department of Homeland Security, and the Department of Defense have their own laboratories, and are now are under a directive by presidential order to implement various security measures.

BRIEF DESCRIPTION OF THE INVENTION

In one aspect, some embodiments of the present invention provide a protocol analyzer apparatus that has a first interface port configured to receive one or more data packets. The one or more data packets comprise a full packet that may include a payload. The packet analyzer apparatus also includes a second interface port configured to transmit data that may include the payload to an industrial machine controller. The apparatus further includes a connection test module having a firewall state table memory indicating permitted existing connections and an indication of whether a full packet of each of the existing permitted connections contains a payload. The connection test module is configured to indicate whether the full packet is part of an existing connection and whether the full packet contains a payload. The apparatus also includes a special protocol analyzer test module. The special protocol analyzer test module is configured to allow the second interface port to transmit data indicative of the full packet when both (a) the full packet is part of an existing permitted connection and (b) the firewall state table memory indicates that the full packet does not contain a payload.

In another aspect, some embodiments of the present invention provide a method for electronically analyzing network traffic. The method includes receiving one or more data packets via a first interface port, wherein the one or more data packets comprise a full packet that may include a payload. The method further includes determining whether the full packet is part of an existing permitted connection, and if so, determining whether the full packet contains a payload, and, if the full packet of the existing permitted connection does not contain a payload, transmitting data indicative of the full packet via the second interface port to an industrial machine controller.

In yet another aspect, some embodiments of the present invention provide a non-volatile, machine-readable memory having recorded thereon instructions configured to instruct an apparatus. The apparatus to be instructed has a processor, a first interface port configured to receive one or more data packets of a full packet that may include a payload, a second interface port configured to transmit data that may include the payload to an industrial machine control, and additional memory. The instructions include instructions to receive one or more data packets via a first interface port, wherein the one or more data packets comprise a full packet that may include a payload. The instructions further include instructions to determine whether the full packet is part of an existing permitted connection, and if so, determining whether the full packet contains a payload. The instructions further include instructions to transmit data indicative of the full packet via the second interface port to an industrial machine controller if the full packet of the existing permitted connection does not contain a payload.

It will thus be appreciated that embodiments of the present invention provide increased security in industrial plants and protection against the various types of malware that could otherwise be introduced into the plant deliberately or accidently. It will also be appreciated that embodiments of the present invention are not limited to use in industrial plants, but can be used in other systems in which network security is to be provided.

Certain of the Figures are subject to the copyright of Secure Crossing Research and Development, Inc. 2011. However, no objection is made to the reproduction of the Figures in conjunction with this patent application or any patent that may issue therefrom.

DETAILED DESCRIPTION OF THE EMBODIMENTS OF THE INVENTION

As used herein, the term "rule" or "analyzing module rule" refers to the specification of an action taken with network traffic. The term "ruleset" refers to an ordered group of rules such as a whole. Unless otherwise specified, the term "ruleset" refers to the entire group of rules, both user configured and automatically added, to an anti-intrusion and security apparatus.

A technical effect of some embodiments of the present invention is to prevent spying, interruption of service, and/or implantation of worms or other malware into an industrial control system having an interconnection to an external network. An appreciation of how this and other technical effects are accomplished by various embodiments will be gained from a complete understanding of the present disclosure.

Figure 1:
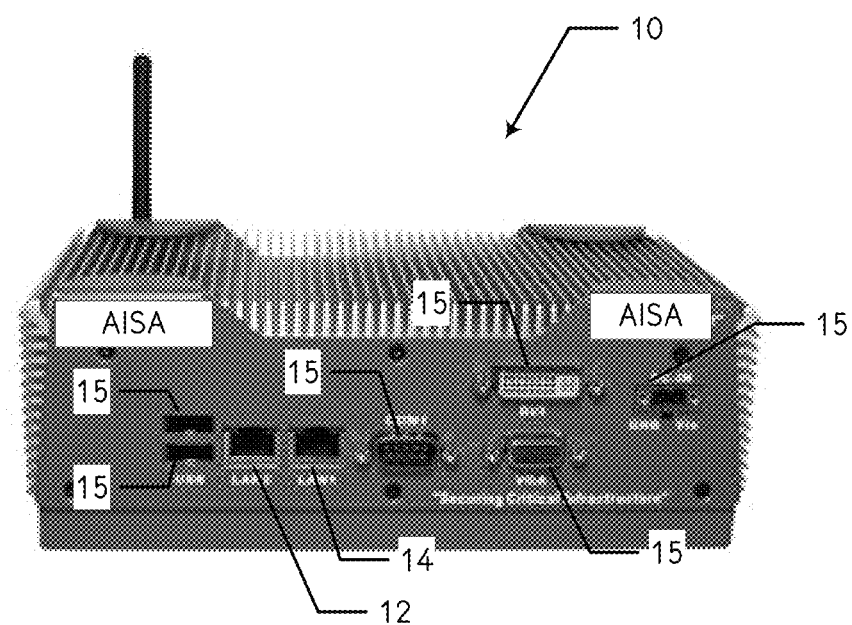
FIG. 1 is a pictorial diagram of one embodiment of an AISA.

In at least one embodiment of the present invention and referring to FIG. 1, an anti-intrusion and security apparatus (AISA) 10 includes two or more gigabit Ethernet ports, for example, Ethernet ports 12 and 14. Port 12 is configured to communicate through an Internet connection or, more generically, any wide area network (WAN), and port 14 is configured to communicate with an internal local area network (LAN). AISA 10 is not limited to having only a single port 12 configured to communicate via Internet or WAN or a single port 14 configured to communicate via LAN. Some embodiments are provided with a plurality of ports 12 configured to communicate using different IP Internet addresses and/or a plurality of WANs, and/or with a plurality of ports 14 configured to communicate with a plurality of LANs or LAN addresses. Such embodiments are simply scaled-up versions of an AISA 10 having only one Ethernet ports 12 and one Ethernet port 14, so, for one skilled in the art, it is necessary to describe in detail embodiments having only one Ethernet ports 12 and one Ethernet port 14. Additional ports 15 of a variety of types may be provided to connect a terminal or workstation for control of AISA 10, for supplying power, and/or adding addon memory, such as an external hard drive or flash drive.

Figure 2:
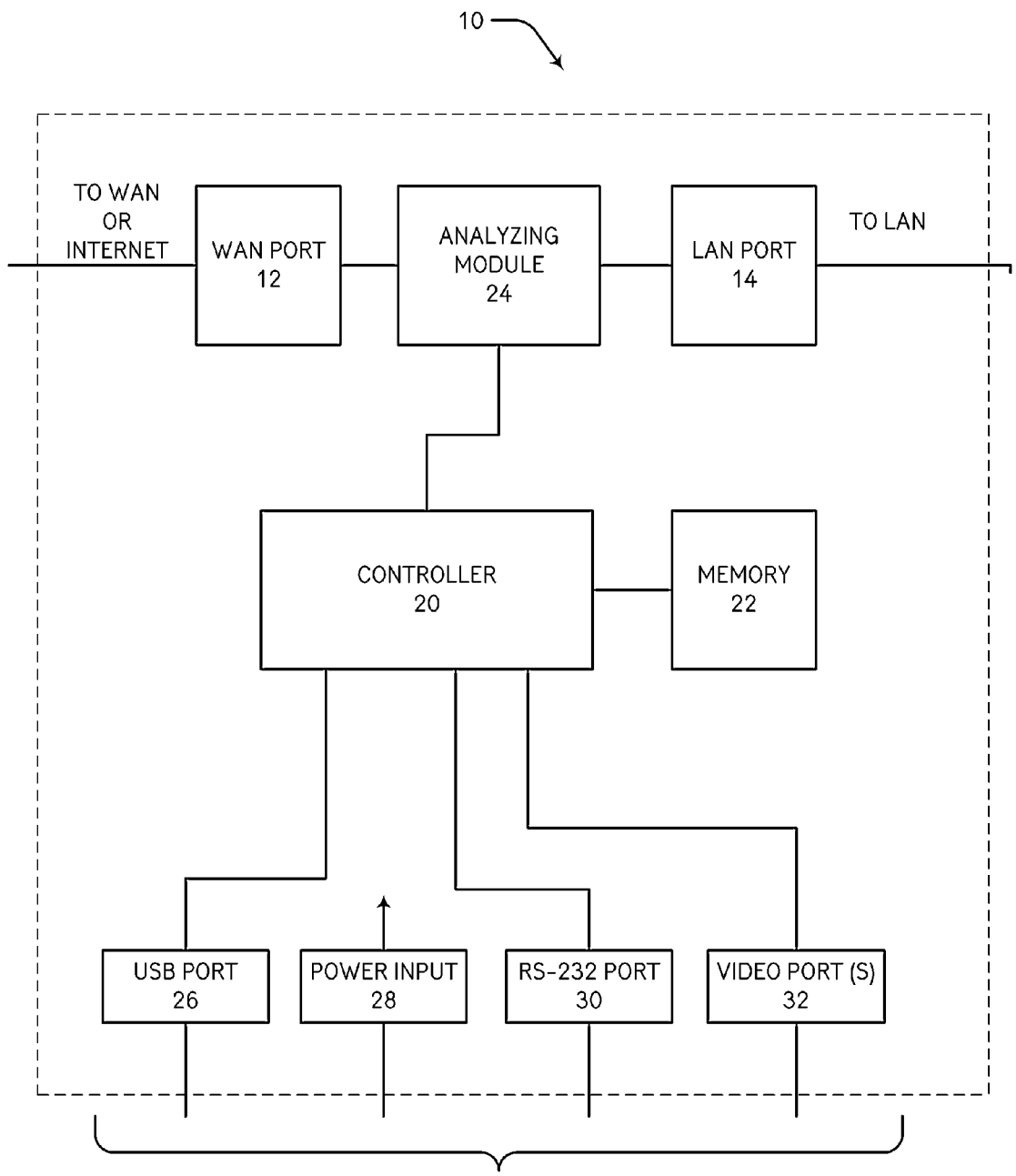
FIG. 2 is a functional block diagram of the AISA of FIG. 1.

More particularly, and referring to FIG. 2, AISA 10 includes a controller or microprocessor 20 and memory 22. Memory 22 may be, for example, random access memory (RAM), non-volatile random access memory (NVRAM), or some combination thereof, and some or all of memory 22 may be included in controller 20. Controller 20 executes a control program embedded in memory 22 and uses this control program to operate one or more analyzing modules 24, which may itself be included in controller 20 and memory 22, and/or which may itself have additional memory (not shown in FIG. 2). Analyzing module 24 controls ingress and egress through WAN port 12 and LAN port 14. In the illustrated embodiment, power for AISA 10 is provided through power input 28. Additional memory, such as for analyzing module tables or rules, may be provided at USB port 26. Controller 20 and/or analyzing module 24 may run programs under the FreeBSD operating system, for example, but this example is not intended to limit the operating system so used in any way. Other embodiments may utilize an embedded form of the Windows operating system, another variant of the UNIX operating system, or the LINUX operating system, for example.

An RS-232 port 30 is provided for a user terminal, workstation, or computer (not shown in FIG. 2), which may also receive video output through video port 32. A mouse (not shown in FIG. 2) may be connected to an additional USB port 26 (not shown in FIG. 2) or to a terminal connected to RS-232 port 30. In some configurations, AISA 10 may accept user input from a terminal somewhere in a connected WAN or LAN.

Figure 3:
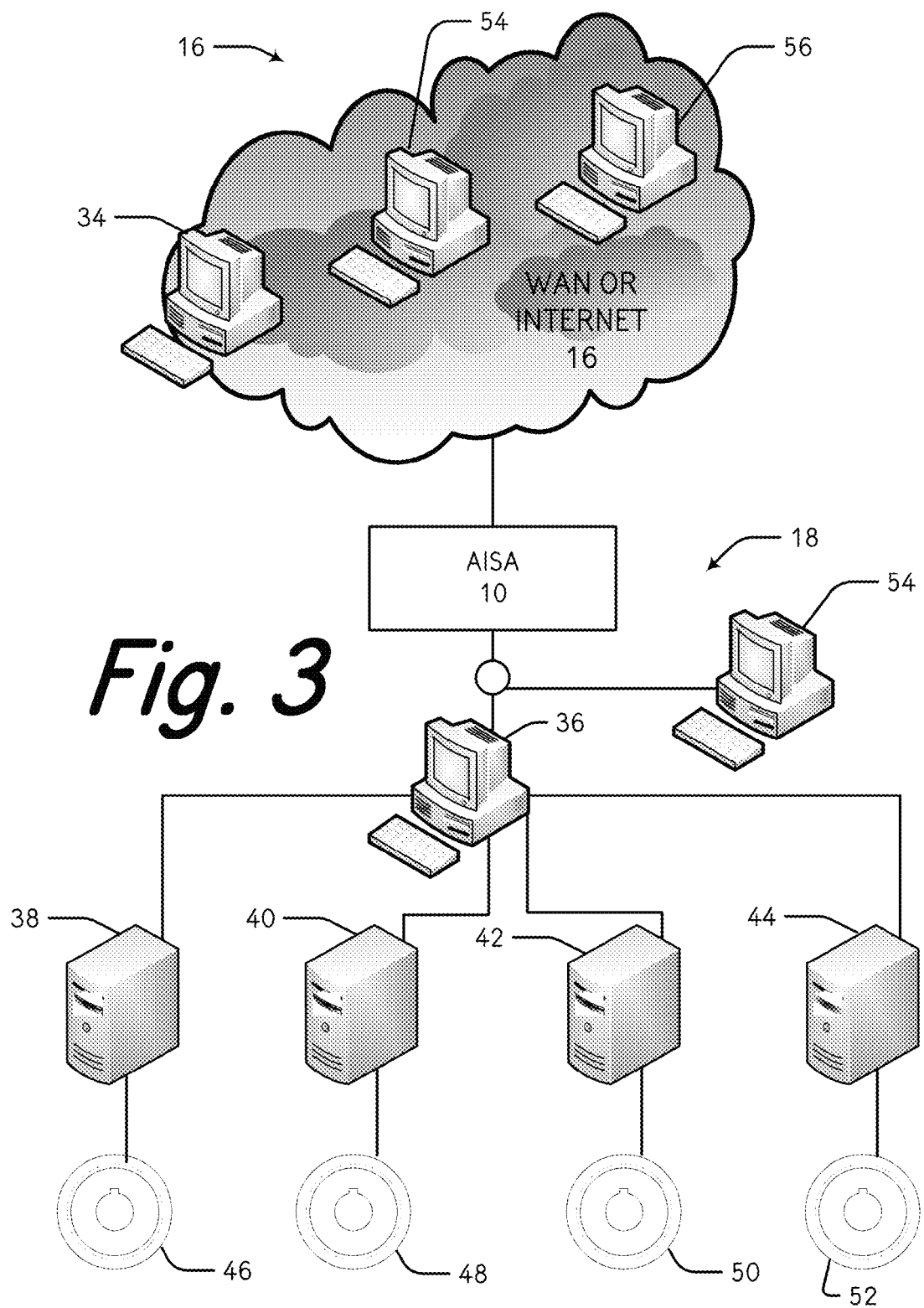
FIG. 3 is a block diagram of an industrial plant communicatively coupled to the Internet using the AISA of FIG. 1.

In some embodiments and referring to FIG. 3, AISA 10 is used to protect a private LAN 18 that includes on or more industrial controllers 38, 40, 42, 44 configured to operate associated industrial equipment 46, 48, 50, and 52. obtain its IP address from a server 36 in LAN 18 via DHCP and to provide a configuration interface that can be accessed by a browser running on a computer 54. Let us suppose, for example, that an IP address of 192.168.200.1 is assigned by a computer 36 in LAN 18 to AISA 10. A computer 54 connected within LAN 18 could then browse https://192.168.200.1 to configure AISA 10. After logging in, AISA 10 automatically invokes a setup wizard. In some configurations, AISA 10 may be preconfigured so that it is not necessary to invoke the setup wizard, but in such configurations, a method to manually invoke the setup wizard (such as browsing to System>Setup Wizard) may be provided. AISA 10 may also be provided with a WAN IP address by a server 34 at or controlled by an Internet service provider so that another computer or computers 54, 56 may configure AISA 10.

A setup wizard comprising code in memory 22 and that is executed by controller 20 is provided in at least one embodiment of the present invention. It will be recognized that variations of the setup wizard may be provided in other embodiments, but these variations will be evident to those skilled in the art of coding upon reading the details of the embodiment described below.

General Information Screen

Figure 4:
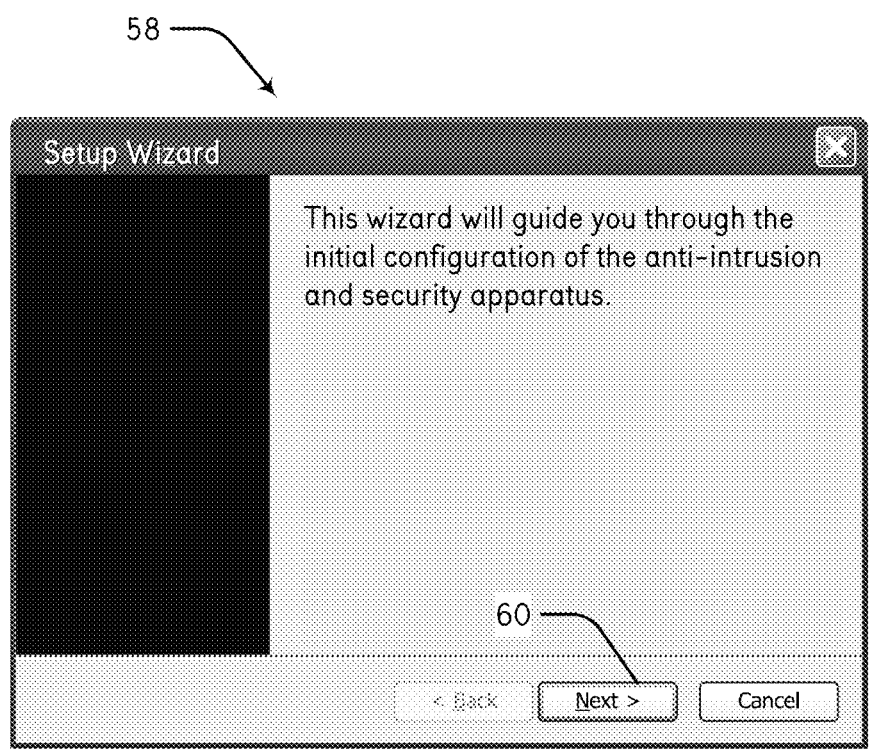
FIG. 4 is a drawing of an introductory screen of a setup wizard provided by the AISA of FIG. 1.
Figure 5:
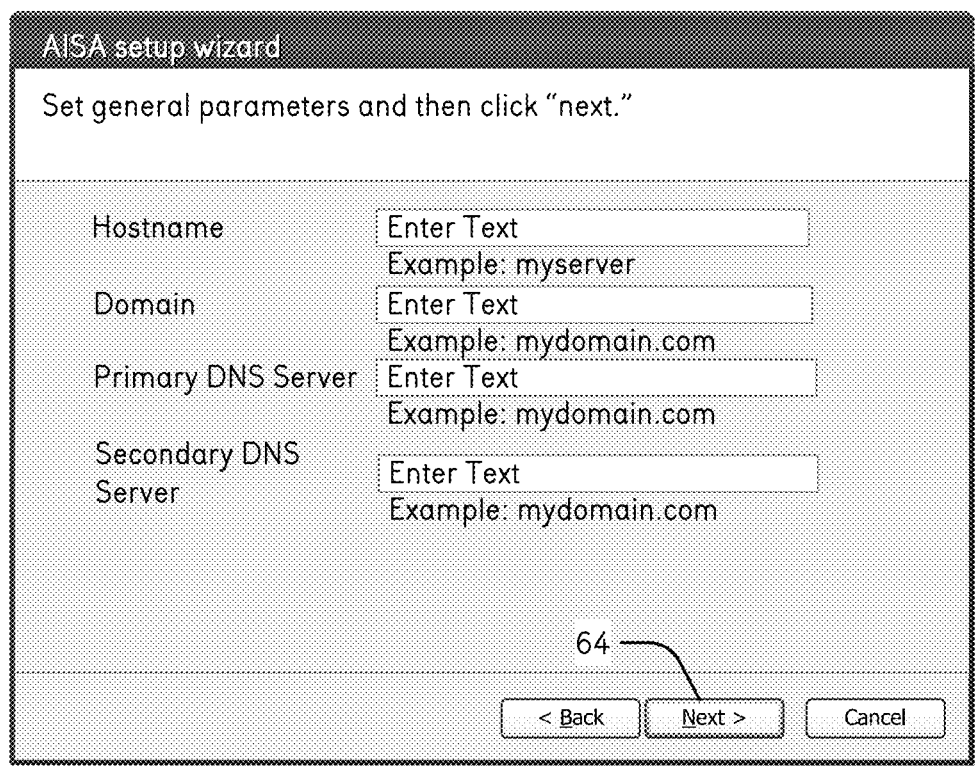
FIG. 5 is a drawing of an AISA general parameter setup screen.

Referring to FIG. 4, an informational pop-up 58 is shown to a user to inform him or her that the initial configuration of AISA 10 is about to begin. After the "Next" button 60 of informational pop-up 58 is clicked by a user and referring to FIG. 5, the setup wizard displays a window 62 that next asks for the name of AISA 10 and the domain in which it resides. The hostname can be, but need not necessarily be restricted by AISA 10 to follow common hostname conventions, such as starting with a letter followed by only letters, numbers, and hyphens. The domain name can be one assigned by a domain naming authority, e.g., example.com or <something>.local, where <something> can be something arbitrarily selected, such as a company name, a last name, a nick name, etc. The hostname and domain name are combined to make up the fully qualified domain name of your router.

The Primary DNS Server and Secondary DNS Server IP addresses may be provided, if known. For dynamic WAN types such as DHCP, PPTP or PPPoE connections, the DNS servers will usually be automatically assigned by an ISP and can be left blank. After the user is finished filling in window 62, the user clicks the Click Next button 64 to proceed.

NTP and Time Zone Configuration

Figure 6:
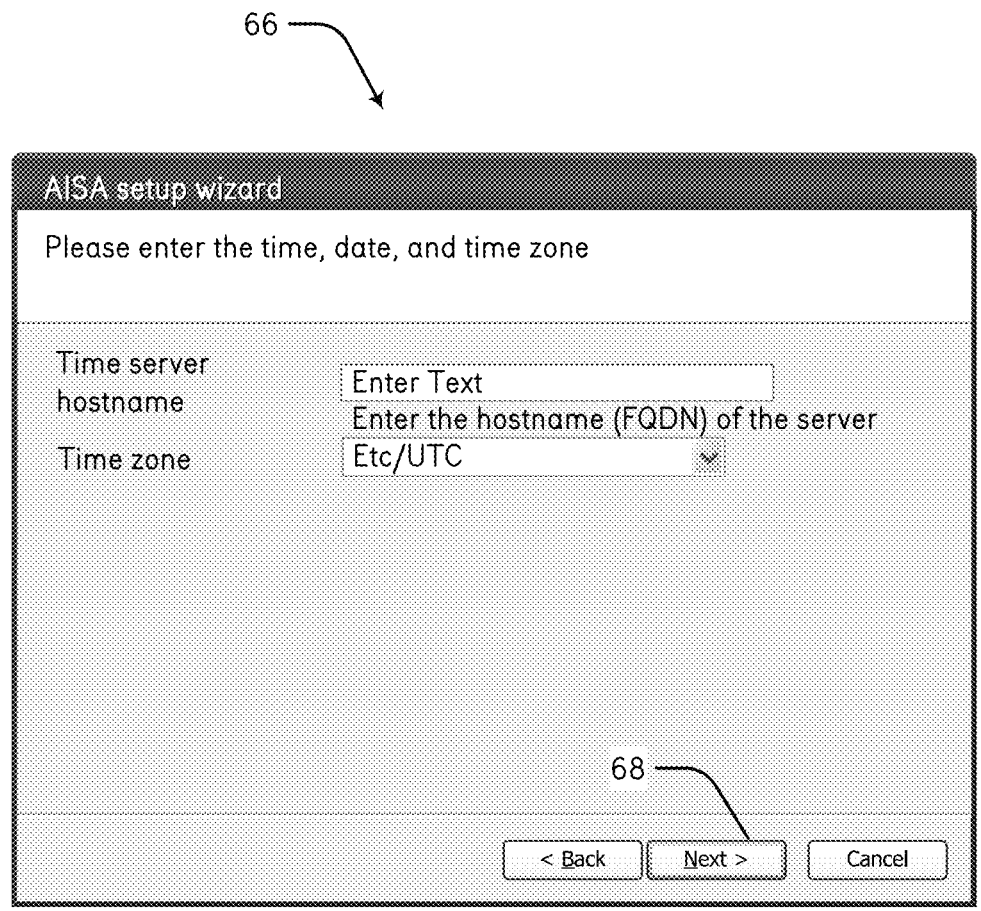
FIG. 6 is a drawing of an AISA date and time setup screen.

Referring now to FIG. 6, the next window 66 accepts information from the user to select a Network Time Protocol (NTP) server and the time zone in which this server resides. Unless the user has a specific preference for a particular NTP server such as one inside the LAN, the time server hostname in the setup wizard can provide, as a fault selection, pool.ntp.org, which picks random servers from a pool of known-good NTP hosts. The user then chooses, for the Timezone selection, a geographically named zone which best matches the location of AISA 10. When finished, the user clicks the Next button 68 to continue.

WAN Configuration

Figure 7:
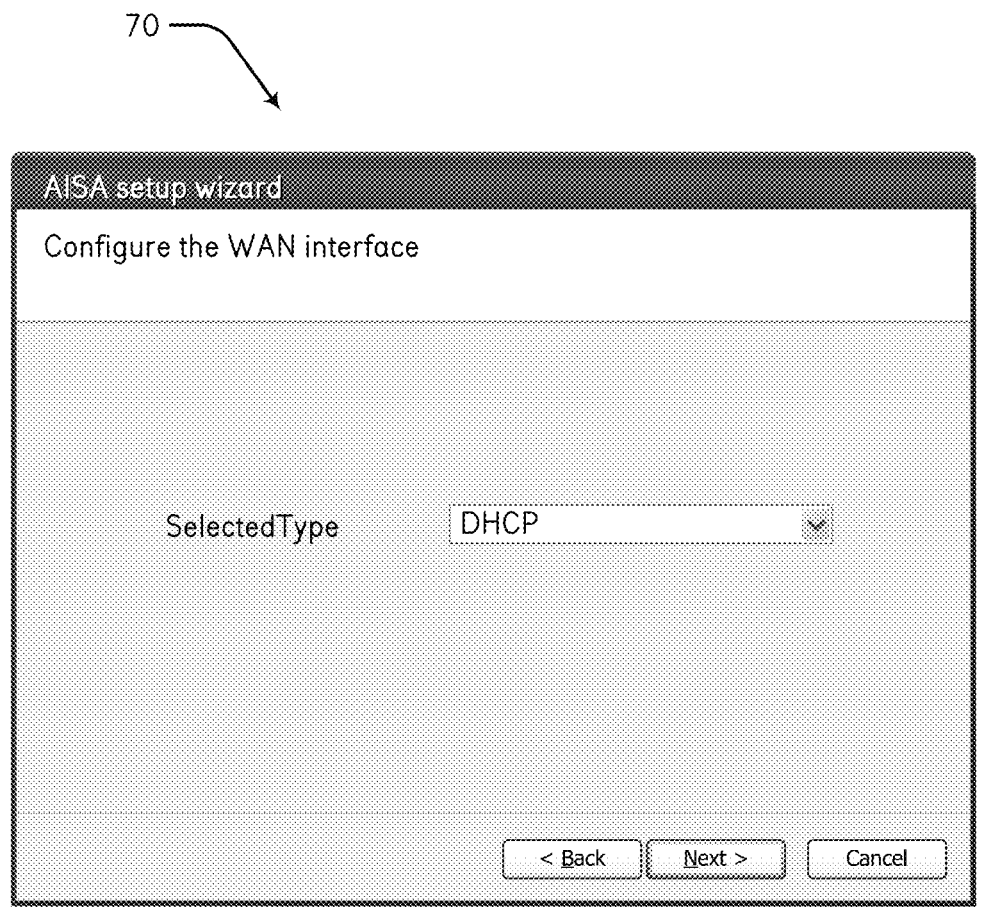
FIG. 7 is a drawing of a WAN interface type setup screen.

In some embodiments and referring to FIG. 7, a user selecting a WAN type ISP connection type results in the webserver presenting a window 70 requesting further information to match information needed by the ISP to allow communication over WAN 16. Possible choices may include Static, DHCP, PPPoE, and PPTP.

Figure 8:
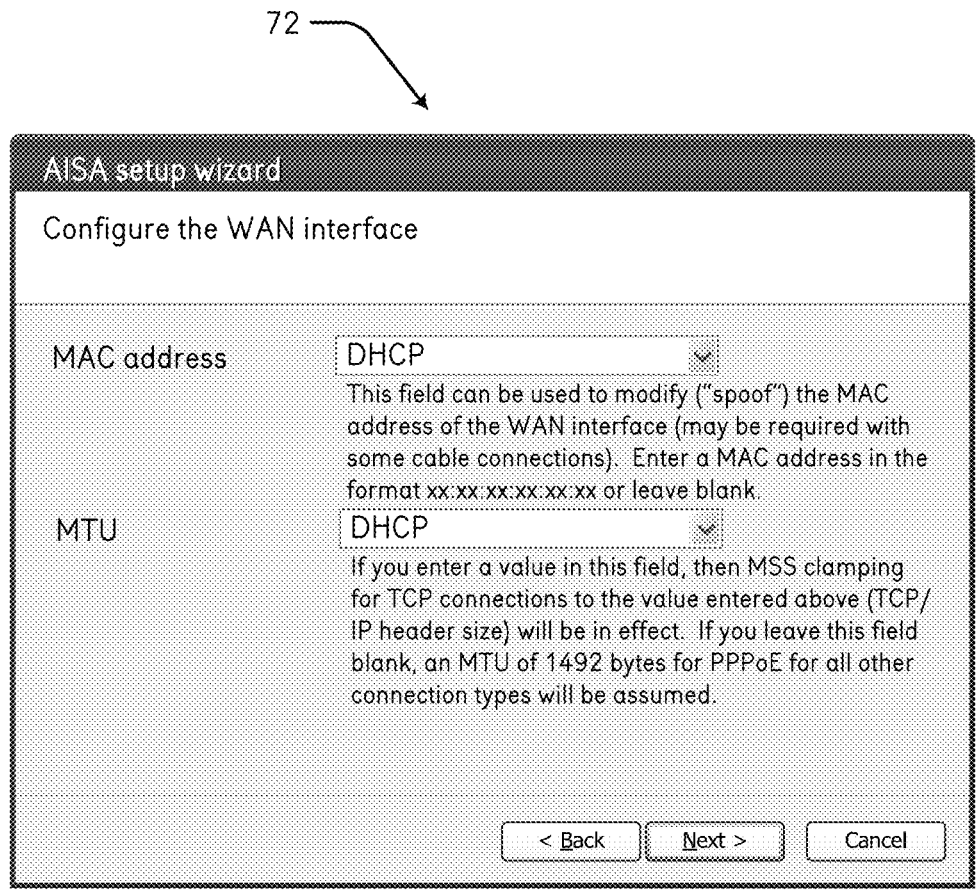
FIG. 8 is a drawing of another WAN setup screen.

A MAC Address field in window 72 of FIG. 8 is useful for replacing an existing router with minimal complications. Some ISPs, particularly those run by cable providers, will not work properly if a new MAC address is encountered. Some require power cycling the modem, others require registering the new address with them over the phone. If this WAN connection is on a network segment with other systems that locate it via ARP, changing the MAC to match and older piece of equipment rather than having to clear ARP caches or update static ARP entries may simplify the use of AISA 10 in a network.

In some configurations, the Maximum Transmission Unit (MTU) size field can be left blank by the user, but may be changed if, for example, a lower MTU is needed to ensure packets are sized appropriately for a particular ISP. In most configurations, a default value for the WAN connection type is provided that will work properly.

Figure 9:
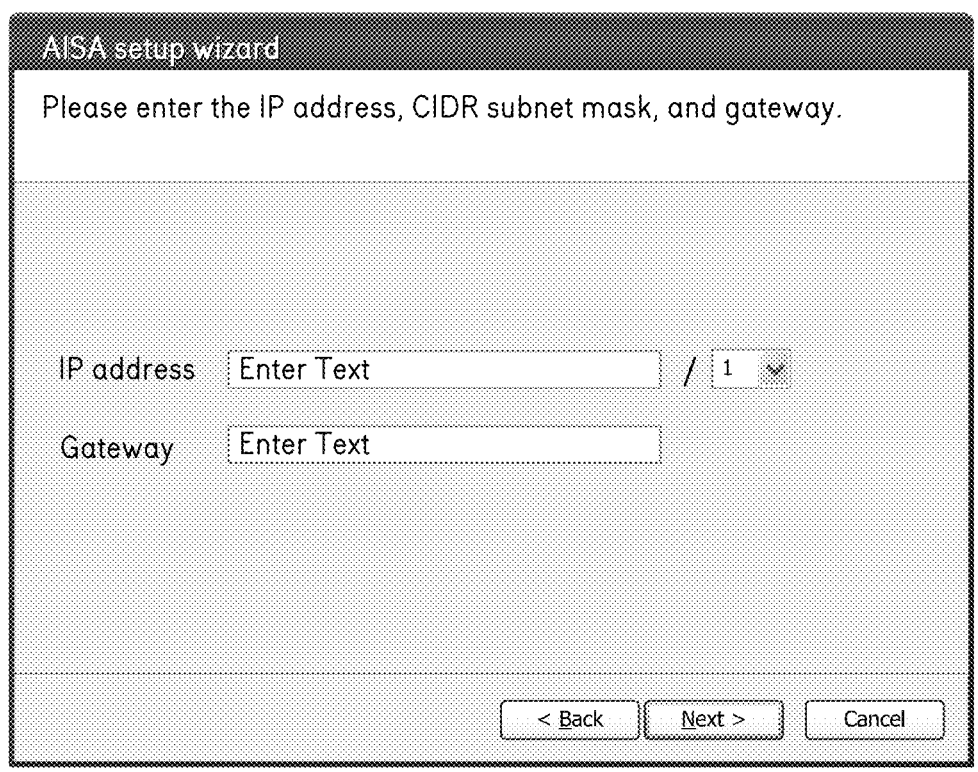
FIG. 9 is a drawing of an IP address and gateway setup screen.

Referring to FIG. 9, if the "Static" choice for the WAN type is chosen, the wizard prompts the user via a window 74 for an IP address, CIDR Subnet mask, and Gateway. This information can be obtained from the ISP or WAN provider. Both the IP Address and Gateway must reside in the same Subnet.

Figure 10:
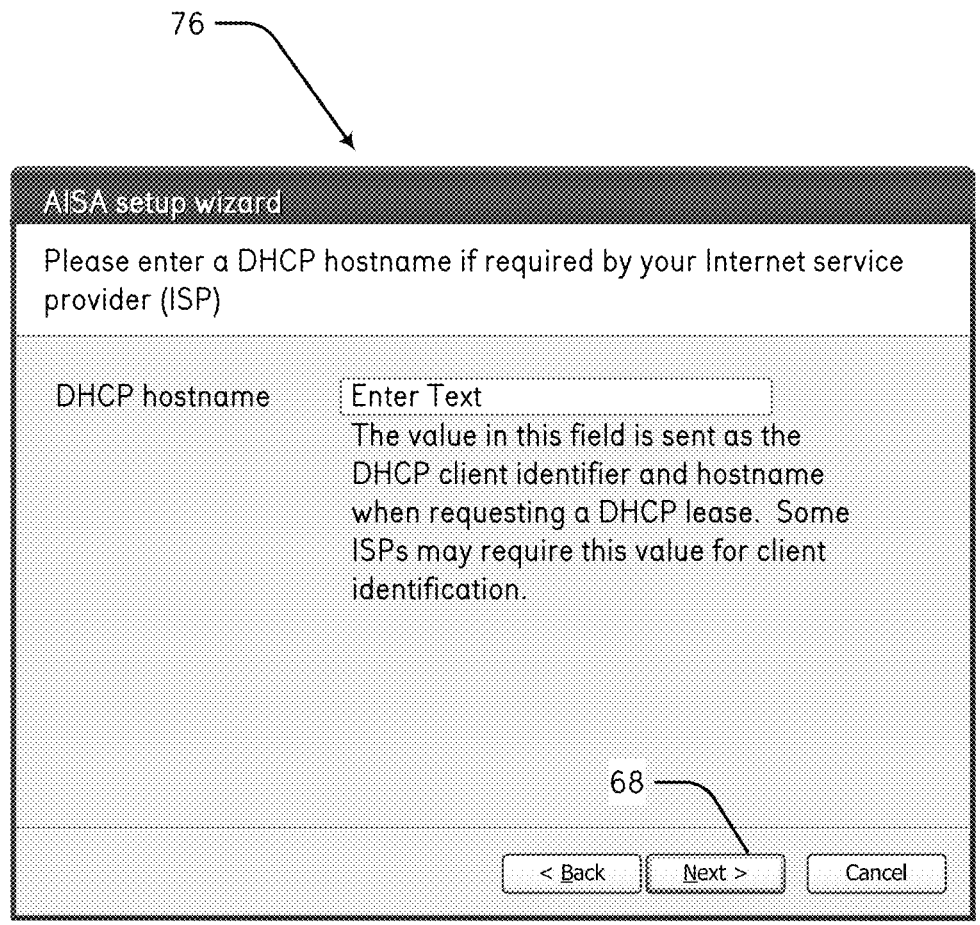
FIG. 10 is a drawing of a DHCP hostname setup screen.

Referring to FIG. 10, some ISPs require a certain DHCP hostname to be sent along with the DHCP request to obtain a WAN IP. Thus, a window 76 is presented by the setup wizard in some embodiments of the present invention to prompt the user to supply the DHCP hostname. This field may be left blank unless it is required by the ISP.

Figure 11:
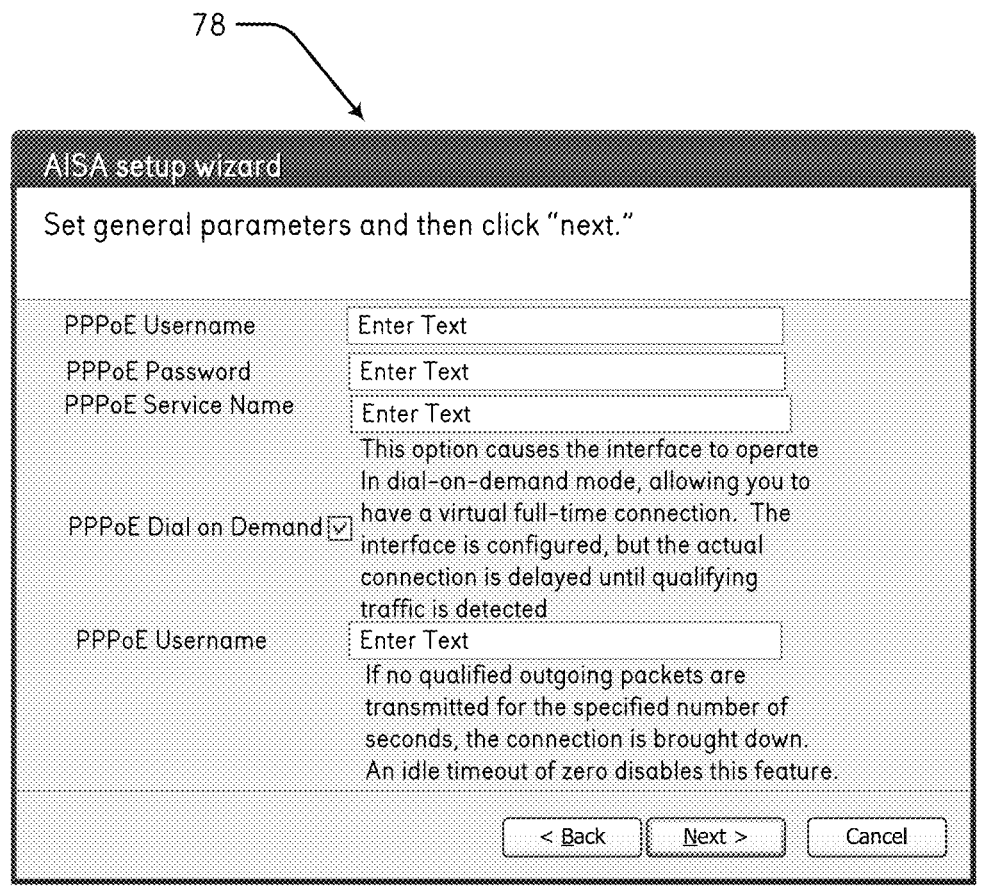
FIG. 11 is a drawing of a PPPoE general parameter setup screen.

When using the PPPoE (Point-to-Point Protocol over Ethernet) WAN type and referring to FIG. 11, a window 78 is presented by the wizard to prompt the user to supply at least a PPPoE username and PPPoE password. This information can be provided by the ISP typically in the form of an e-mail address, such as mycompany@ispexample.com. The PPPoE Service name may be required by some, but not all ISPs, and thus may be left blank in some configurations.

AISA 10 also provides a PPPoE dial on demand option that leaves a connection to WAN 16 down or offline until data is requested that requires connection to WAN 16. Logging into a PPPoE dial on demand service is quite fast, so the delay while a connection is setup may be negligible. However, if there are any services running on internal network or LAN 18, a user may choose not to select this option.

The PPPoE Idle timeout specifies how much time AISA 10 lets the PPPoE connection go without transmitting data before disconnecting. This option is only useful when coupled with Dial on demand, and is typically left blank (i.e., disabled).

A PPTP (Point-to-Point Tunneling Protocol) WAN type option window (not shown) is provided in some embodiments of the present invention. This option is for ISPs that require a PPTP login rather than connecting to a remote PPTP Virtual Private Network (VPN). These settings can be obtained from the ISP if this type of login is required. A local IP address, CIDR subnet mask, and Remote IP Address are required to establish the connection. The displayed option window is similar to window 78 except that the term "PPPoE" is replaced by "PPTP," the "PPPoE service name" input field is replaced by a "PPTP Local IP Address field that includes a mask, and a "PPTP Remote IP Address" field is added.

Figure 12:
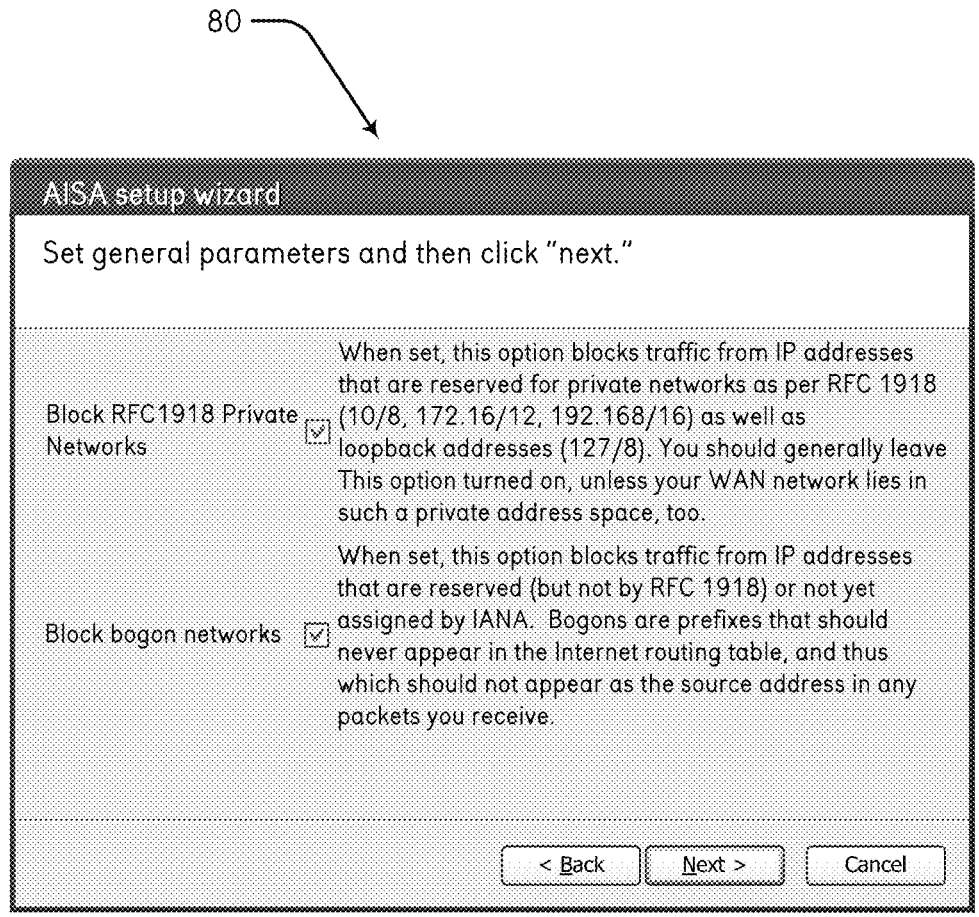
FIG. 12 is a drawing of a setup screen that is used to block or unblock RFC1918 private networks and/or bogon networks.

Referring to FIG. 12, the setup wizard provides a window 80 for ingress filtering, i.e., the prevention of invalid traffic from entering internal network 18. Selecting "Block RFC 1918 Private Networks" blocks registered private networks such as 192.168.x.x and 10.x.x.x from making connections to the IP address of WAN port 12. If the WAN IP address of AISA 10 resides on a privately numbered network, "Block RFC 1918 Private Networks" would likely not be selected by a user. The "Block bogon networks" option will stop traffic from coming in that is or appears to be sourced from reserved or unassigned IP space that should not be in use. In some configurations, AISA 10 periodically and automatically updates the list of bogon networks in the background.

LAN Interface Configuration

Figure 13:
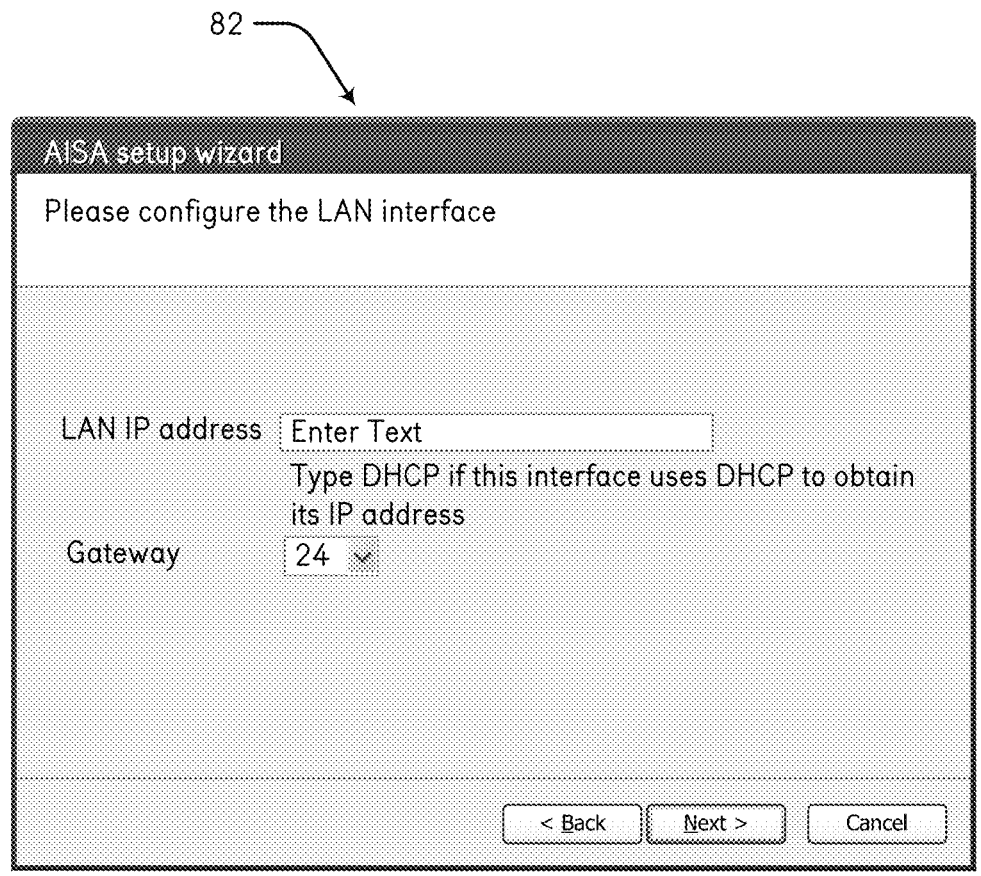
FIG. 13 is a drawing of a LAN interface setup screen.
Figure 14:
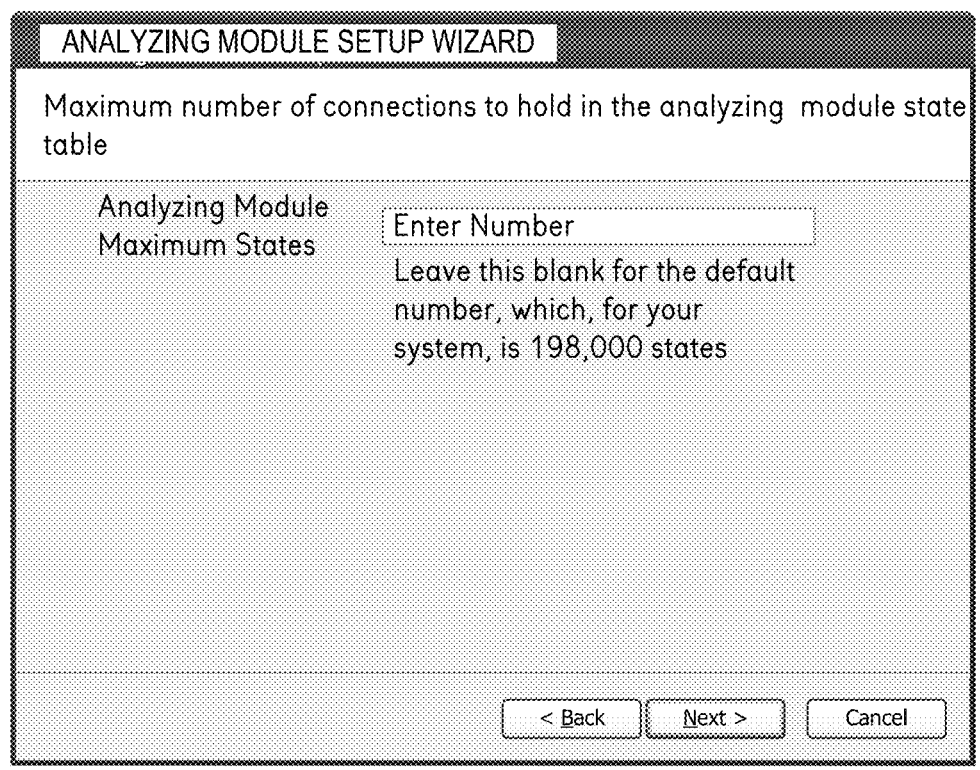
FIG. 14 is a drawing of an analyzer module setup screen to set the maximum number of connections to hold in an analyzing module state table.

Referring to FIG. 13, the setup wizard provides a window 82 to provide a user with an opportunity to change the LAN IP Address and Subnet Mask. If these settings are changed, the user's PC IP address will have to be adjusted, its DHCP lease released or renewed, or the user will need to perform a "Repair" or "Diagnose" on LAN network port 14 when he or she is finished with the setup wizard.

Set Admin Password

The setup wizard provides a window (not shown in the Figures) that allows a user to change an administrative password that is used to access the setup wizard. After clicking the "Next" button, a concluding window for the setup wizard (also not shown) will be presented by the web server. A "reload" button on this concluding window can be clicked by the user to reload the WebGUI with the new settings.

Configuring the Analyzing Module

Rulesets

In AISA 10, rulesets are evaluated on a first match basis, wherein the first rule of the ruleset that matches is interpreted by AISA 10 to determine how to handle a data packet. Processing stops for the data packet, and after reaching this match, the action specified by that rule is taken. The most permissive rules are best placed toward the bottom of the ruleset so that restrictions or exceptions can be made above them.

Stateful Analyzing

Referring again to FIG. 2, AISA 10 contains a stateful analyzing module 24, permitting traffic on the interface or port 12 or 14 where the traffic is initiated. When a connection is initiated by a device that is directed through AISA 10 that matches a "pass" rule in AISA 10, an entry is created in the state table of AISA 10 in memory 22 in which information on active connections through AISA 10 is retained. Reply traffic to connections initiated inside internal network 18 is automatically allowed back into network 18 by the state table. This reply traffic may include related traffic using a different protocol than that initiated by the device, such as ICMP control messages that may be provided in response to a TCP, UDP, or other connection.

State Table Size

The AISA 10 state table in memory 22 has a maximum size in some configurations of the present invention to avoid memory exhaustion. For example, in some configurations, each state may require approximately 1 KB of RAM. The state table size in many such configurations is dynamically calculated based on the amount of memory installed in the system. In at least one configuration, a default state table size in an AISA 10 with 2 GB RAM is 198,000 states. If 198,000 active connections are traversing an AISA 10 configured in this manner, any additional connections will be dropped. This limit can be increased by browsing to the System>Advanced page, which causes the webserver to provide a GUI interface on which the user can click a Analyzing Module/NAT tab. A wizard then provides a window 84 in which the desired number for Analyzing Module Maximum States can be entered. A safe maximum limit depends on the other features in use on AISA 10, although many configurations are provided with sufficient memory to accommodate up to 1 million states. To aid in determining how many states may be needed, some AISA 10 configurations provide a display of historical state usage that can be accessed by a user.

Ingress Filtering

Ingress filtering refers to the filtering of traffic coming into internal network 18 from the Internet or other wide area network 16. In deployments having a plurality of WAN or Internet ports 12, there may be a plurality of ingress points if the plurality of ports 12 are actually deployed. A default ingress policy for many configurations of AISA 10 is to block all traffic, as no "allow" rules are provided on WAN port 12 by default. However, replies to traffic initiated from internal network 18 are automatically allowed through by the state table.

Egress Filtering

Egress filtering refers to the filtering of traffic initiated inside your network destined for the Internet or any other interface on the analyzing module. In some configurations, AISA 10 is pre-programmed with a default LAN rule allowing everything from LAN 18 out to the Internet 16. However, AISA 10 is provided with a GUI interface that allows a user to employ egress filtering.

Experience has shown that most small companies and home networks do not employ egress filtering. The use of such filtering can increase administrative burden, as each new application or service may require opening additional ports or protocols in an analyzing module. In some environments, it is difficult to employ egress filtering because administrators may not know precisely what communication occurs on the internal network 18 and are hesitant to break things. In still other environments, workplace politics has a role in the decision whether or not to employ egress filtering.

Nevertheless, tight egress filtering is important for several reasons. Tight egress filtering can limit the impact of a compromised system. Malware commonly uses ports and protocols that are not required on many networks. Many so-called "bots" rely on Internet Relay Chat (IRC) connections to "phone home" and receive instructions. Some malware uses more common ports such as TCP port 80 (normally HTTP) to evade egress filtering, but many other malware do not. By not permitting traffic over TCP port 6667, the usual IRC port, bots that rely on IRC to function will no longer do so.

Outbound SMTP on TCP port 25 should only be allowed to leave internal network 18 from a mail server, if internal network 18 has such a server. If a mail server is externally hosted, devices on internal network 18 should only be permitted to communicate to that specific externally hosted mail server on WAN TCP port 25. This limitation prevents every other system in internal network 18 from being used as a "spam zombie," since their SMTP traffic will be dropped. Preventing "spam zombies" has the benefit of limiting spam and also helps avoid internal network 18 from being added to numerous blacklists across the Internet that may prevent the sending of legitimate email to many mail servers.

In some circumstances, egress filtering can prevent systems in the internal network 18 from being compromised. Some exploits and worms require outbound access to succeed. For example, the Code Red worm discovered in 2001 caused affected systems to retrieve an executable file via TFTP (Trivial File Transfer Protocol) and then execute it. Web servers do not generally require the use of the TFTP protocol, so blocking TFTP via egress filtering was found to prevent infection by the Code Red worm even on unpatched servers.

Also, the egress filtering provided in some configurations of AISA 10 can be used to limit unauthorized application usage. Some applications, such as VPN clients, peer-to-peer software, and instant messengers rely upon special ports or protocols to function. While a few peer-to-peer and instant messengers port hop to find egress from an internal network 18, many will be prevented from functioning by a restrictive egress ruleset, which is effective in limiting many types of VPN connectivity.

In some configurations of AISA 10, spoofed traffic is automatically blocked based upon the system routing table.

Certain protocols should never be allowed to leave internal network 18 to prevent information about internal network 18 from leaking to Internet or WAN 16. Specific examples include, but are not limited to, Microsoft RPC (Remote Procedure Call) on TCP port 135, NetBIOS on TCP and UDP ports 137 through 139, and SMB/CIFS (Server Message Block/Common Internet File System) on TCP and UDP port 445. Other protocols for which it may be desirable to limit egress include syslog, SNMP, and SNMP traps. By allowing only that traffic which requires out-of-network traffic (i.e., egress from internal network 18 to Internet or WAN 16), misconfigured network devices may be prevented from sending logging and other potentially sensitive information out onto Internet or WAN 16.

Egress filtering can be implemented by first adding rules to AISA 10 for traffic known to require egress. An example of such traffic is shown below in Table I. All other traffic is dropped by a default rule. Logging can be enabled for "pass" rules, which can then be manually or automatically analyzed them to determine what traffic is leaving internal network 18.

TABLE I

EXAMPLE OF KNOWN REQUIRED TRAFFIC

| Description | Source IP | Destination IP | Destination Port |
|---|---|---|---|
| HTTP and HTTPS from all hosts | Any | Any | TCP 80 and 443 |
| SMTP from mail server | Mail Server IP | Any | TCP 25 |
| Recursive DNS queries from internal DNS servers | DNS server IP | Any | TCP and UDP 53 |

In some configurations of the present invention, traffic can be disallowed by two different AISA 10 rules, namely, "block" and "reject." The block setting silently drops traffic. This is the behavior of the default deny rule in AISA 10, hence in a default configuration, all traffic initiated from the Internet will be silently dropped. On the other hand, the reject rule sends a response to denied TCP and UDP traffic, thereby letting the host that initiated the traffic know that the connection was refused. Rejected TCP traffic gets a TCP RST (reset) in response, and rejected UDP traffic gets an ICMP unreachable message in response. Though some embodiments of AISA 10 allow "reject" to be selected for any rule, IP protocols other than TCP and UDP cannot be rejected but rather are silently dropped because there is no standard for rejecting other protocols. Blocking traffic can be more secure than rejecting traffic for egress control, because blocking prevents internal network 18 from being seen and discovered by a port scanner. For internal interfaces, reject traffic may be more preferable, because when a host tries to access something it is not permitted to access, the application on the host trying to make the access may hang until the connection times out. By rejecting rather than blocking the traffic, the connection is immediately refused, thereby avoiding these hangs.

Notably, AISA 10 can be configured for a specific set of rules for both ingress and egress traffic. In this regard, AISA 10 can function as a bi-directional analyzing module.

Introduction to the Analyzing Module Rules Screen

Figure 15:
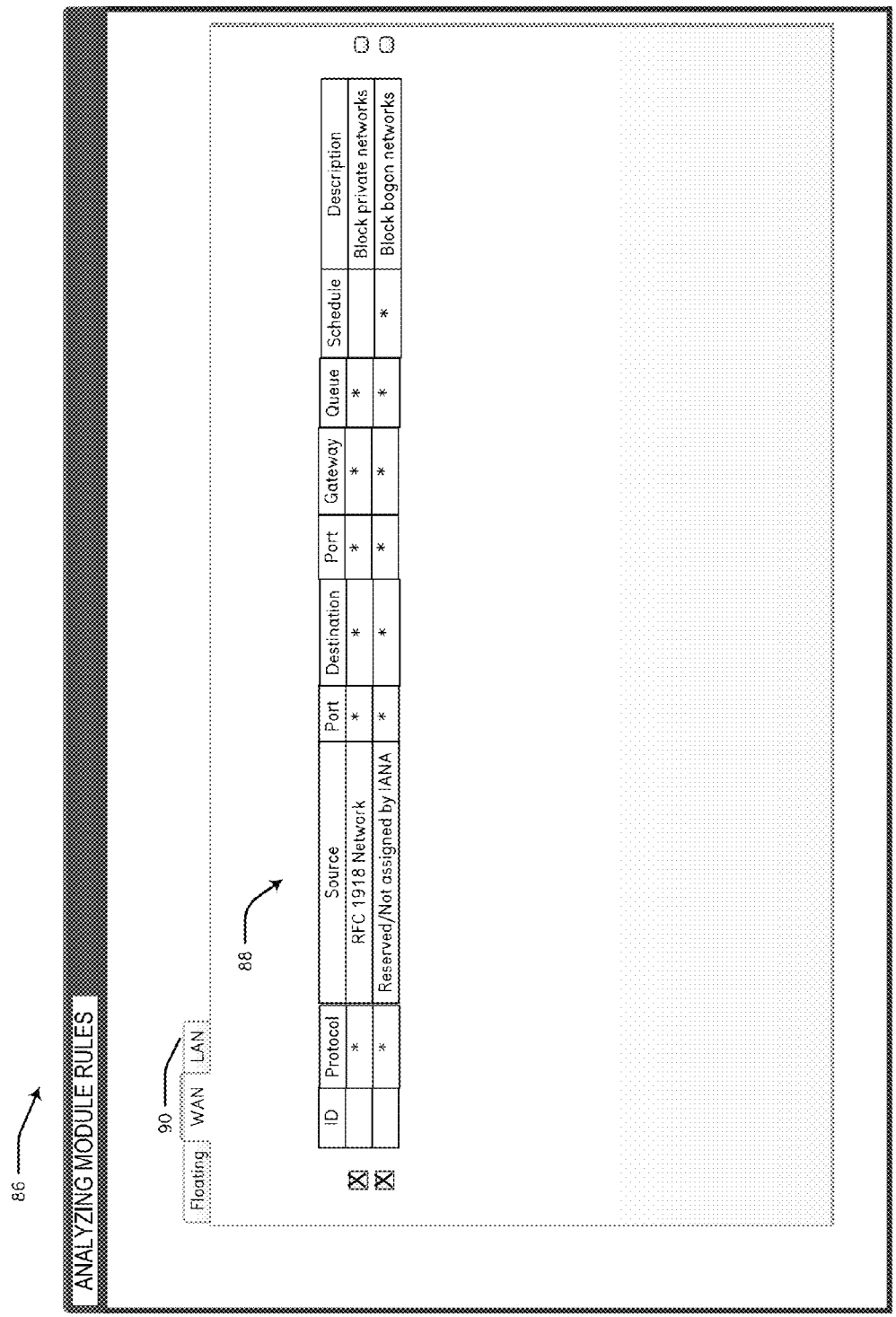
FIG. 15 is a drawing of an analyzer module rule specification setup screen for the WAN.

In some embodiments and referring to FIG. 15, when the user browses to Analyzing Module>Rules, AISA 10 sets up the web server to display a window 86 with an editable WAN ruleset 88, which by default has no entries other than to block private networks and block bogon networks if these entries have been enabled. If the user clicks to the right of the block private networks or block bogon networks rules in this example, the web server will display a WAN interface configuration page, where these options can be enabled or disabled.

Figure 16:
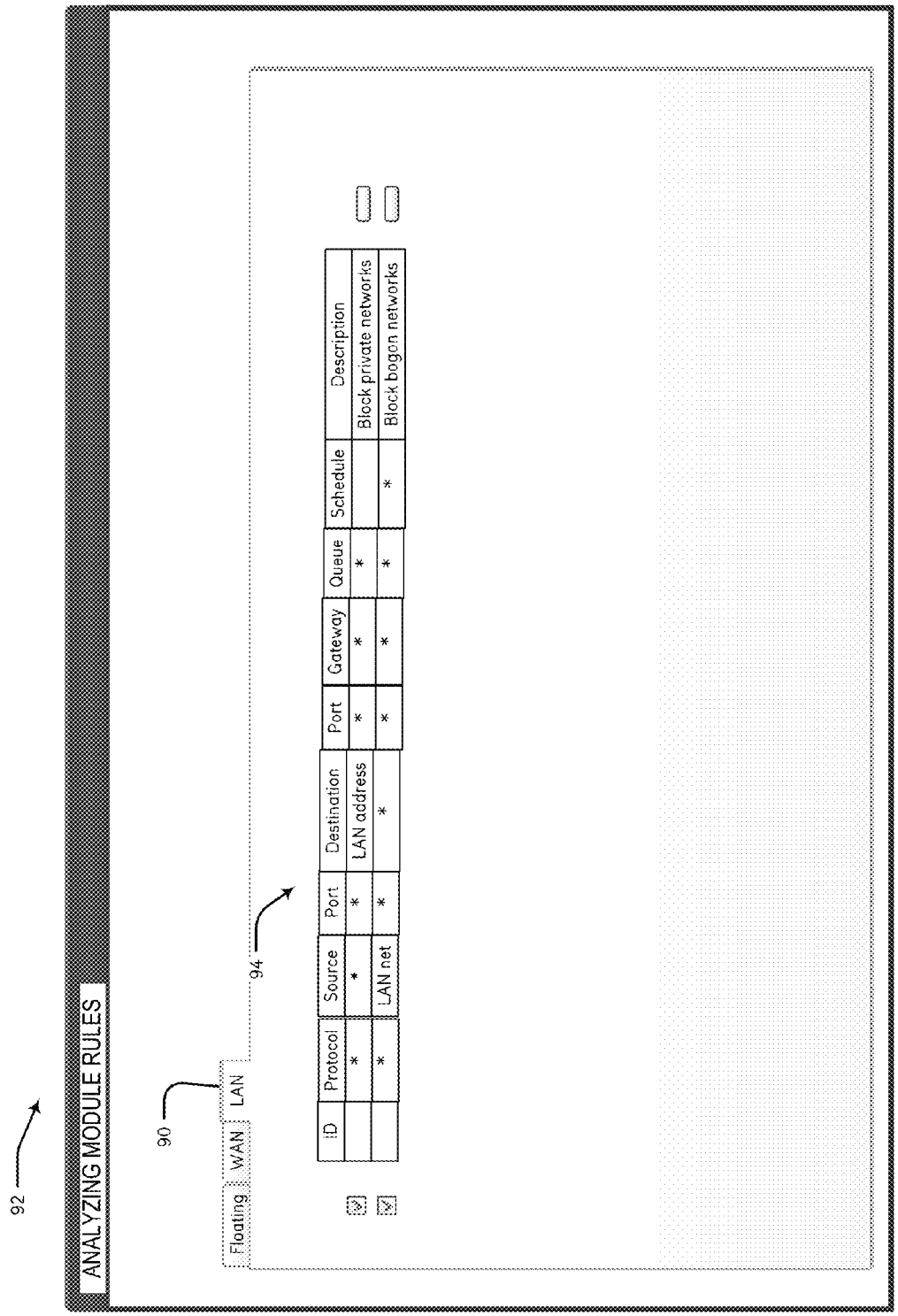
FIG. 16 is a drawing of an analyzer module rule specification setup screen for the LAN.

If the user clicks on LAN tab 90, the web server displays an editable screen 92 with LAN rules 94, as seen in FIG. 16. By default, this screen includes only a placeholder for the anti-lockout rule and the Default LAN->any rule. As with the select block private network and bogon network rules on the WAN tab, when the user clicks next to the anti-lockout rule, the web server navigates to the settings page where the user can disable the anti-lockout rule. The anti-lockout rule allows access on the LAN interface to the AISA 10's LAN IP address on port 22 (SSH), 80 (HTTP) and 443 (HTTPS) to ensure that administrative access to the unit is maintained even if the analyzing module rules for the LAN are altered such that access would otherwise be cut off.

The user can review rules for other interfaces by clicking their respective tabs. OPT interfaces will appear with their descriptive names, so if the OPT1 interface is named DMZ, then the tab for its rules will also say DMZ.

To the left of each rule is an indicator icon showing whether the action of the rule is pass, block, or reject. If logging is enabled for the rule, some embodiments of the web server also show a blue circle containing an "i" (not shown in the Figures). If a rule has advanced options set, an "a" will be displayed (also not shown in the Figures.). The same icons are used for disabled rules, except the icon, like the rule, will be grayed out.

Adding an Analyzing Module Rule

The web server can accept clicks on either of the buttons on the Analyzing Module:Rules screen to add a new rule. Clicking on the top button adds a rule to the top of the ruleset, whereas clicking on the bottom button adds a rule at the bottom.

To make a new rule that is similar to an existing rule, the user can click at the end of the row containing the rule to copy. The web server then displays an edit screen with settings for the existing rule pre-filled and ready to be adjusted.

Editing Analyzing Module Rules

The web server allows a user to edit analyzing module rules by clicking to the right of a rule or by double clicking anywhere on the line containing the rule. The web server will then present an edit screen for that rule, where the user can make any needed adjustments.

Moving Analyzing Module Rules

Rules may be reordered on their own or in groups. To move rules in the list, a user can check a box next to rules that should be moved or the user can single click the rule (which will also check the box), then click the button on the row underneath the relocated rules. When the user hovers the mouse pointer over the display, the web server will present a thick bar to indicate where the rules will be inserted. After the user clicks, the rules will be inserted above the chosen row. A user may also select rules to move by single clicking anywhere inside of the row he or she wishes to select.

Deleting Analyzing Module Rules

To delete a single rule, a user can click to the right of the rule. The web server then prompts to confirm the deletion, and the user can then click "OK" to confirm that he or she actually wants to delete the rule.

To delete multiple rules, a user can check a box at the start of rows that should be removed and then click at the bottom of the list. The user may also select rules by single clicking anywhere on a line containing the rule.

Aliases

Aliases allow a user to group ports, hosts, or networks and refer to them by name in analyzing module rules, NAT configurations and traffic shaper configurations. Aliases can provide significantly shorter and more manageable rulesets. Boxes in the web interface are presented with a red background to indicate where aliases can be used. (Aliases in this context should not be confused with interface IP aliases, which permit the addition of additional IP addresses to a network interface.)

Configuring Aliases

To add an alias, a user would navigate to the Analyzing Module>Aliases screen and click a button. To add new members to an alias, a user would click at the bottom of a list of entries on an Analyzing Module:Aliases:Edit screen.

Host aliases allow the creation of groups of IP addresses.

Network aliases allow the creation of groups of networks or IP ranges via the use of CIDR summarization. Single hosts can also be included in network aliases by selecting a /32 network mask.

Port aliases enable the grouping of ports and port ranges. The protocol is not specified in an alias but rather in an analyzing module rule in which an alias is used and that analyzing module rule defines the protocol as TCP, UDP, or both.

Boxes are presented by the webserver with a red background to indicate that they will accept an alias. When the user types the first letter of an alias into any such input box, a list of matching aliases is displayed. The user can select the desired alias or type its name out completely. Only aliases of the appropriate type are shown. For fields that require an IP address or subnet, only host and network aliases are shown. For fields that require ports, only port aliases are shown. If there are multiple aliases of the appropriate type beginning with the typed letter, the drop down list that appears shows all the matching aliases of that type.

If a user hovers a mouse over an alias on a Analyzing Module>Rules screen, a box appears showing the contents of the alias with the descriptions included in the alias.

In some configurations of the present invention, AISA 10 permits the nesting of aliases within other aliases, and includes the ability to enter a URL location of an alias for download.

Analyzing Module Rule Best Practices

Default Deny

There are two basic philosophies in computer security related to access control, namely "default allow" and "default deny." A "default deny" strategy should always be used with AISA 10 analyzing module rules. The rules should be configured to permit only the bare minimum required traffic for the needs of the network and drop all other traffic with the default deny rule of AISA 10. The number of deny rules in the ruleset will thus be minimized.

In a default two interface LAN and WAN configuration, AISA 10 provides a "default deny" rule on the WAN interface and a "default allow" rule on the LAN interface. All inbound traffic from the Internet is denied and all outbound traffic from the LAN is permitted. All known home grade routers use this methodology as do all known similar routers and commercial offerings. However, this default configuration is not usually the best configuration in an industrial plant.

Some firewall users may ask, "what bad things do I need to block?" That's the wrong question, as it applies to a firewall in which the default rule is to permit traffic. Noted security professional Marcus Ranum includes default permit in his "Six Dumbest Ideas in Computer Security" paper. The paper can be found at http://ranum.com/security/computer_security/editorials/dumb/index.html.

A better strategy is to permit only what is required, avoid leaving the "default allow all" rule activated on the LAN, and adding block rules for undesirable traffic above the permit rule. More particularly, the strategy should be to allow only known "good" packets rather than block "bad" packets, at least to the extent possible.

A shorter ruleset is easier to manage. Long rulesets may be difficult to understand and error prone, overly permissive, and significantly more difficult to audit. Aliases can be used to keep rulesets as short as possible.

Review Your Rules

A user should manually review his or her analyzing module rules and NAT configurations on a periodic basis to ensure that the rules and configurations still match the minimum requirements of the current network environment. The recommended frequency of such review varies from one environment to another. In networks that do not change frequently and that have a small number of analyzing module administrators and effective change control procedures, quarterly or semi-annual reviews are usually adequate. For fast-changing environments or those with poor change control and a larger number of analyzing module administrators, the configuration should be reviewed on at least a monthly basis.

In all but the smallest networks, it can be hard to recall the configuration of the analyzing module and the reasons for its being configured in that manner. Therefore, use of the description field in analyzing module and NAT rules is always recommended. In larger or more complex deployments, the user should also maintain a more detailed configuration document describing the entire AISA 10 configuration. When reviewing the configuration in the future, this detailed configuration document should help a user to determine which rules are necessary and why they are necessary.

It is important to keep this detailed configuration document up-to-date. When performing periodic configuration reviews, the user should review this document to ensure the document remains up-to-date with the current configuration. The user should ensure that this document is also updated whenever configuration changes are made.

Reducing Log Noise

The "default deny" rule in AISA 10 enables logging by default, so that all traffic blocked from the Internet is logged. In many environments, and by way of example, NetBIOS broadcasts from Windows machines will swamp this log. To avoid the problem, a "block" rule can be added on the WAN interface for repeated noise traffic. By adding a block rule that does not enable logging, repeated noise traffic will still be blocked, but will no longer fill the logs.

A rule can be configured to reduce log noise. For example, a rule can be added to block, but not log, traffic with a destination address of the broadcast address of that subnet of the LAN.

Similar rules should also be added that match the specifics of any log noise seen in any particular environment. The user should check the analyzing module logs under Status>System Logs, Analyzing Module tab to see what kind of traffic is being blocked and to review its frequency. As a rule of thumb, if any particular traffic is consistently being logged more than 5 times a minute, logging of this traffic should probably be presented.

Logging Practices

In some embodiments of the present intention, AISA 10 does not log any passed traffic and logs all dropped traffic. However, blocked traffic cannot harm an industrial plant, so its log value is limited, whereas traffic that gets passed could be very important log information to have if a system is compromised. After eliminating any useless noise as described above, the remaining log entries are of some value for trend analysis. If there is significantly more or less log volume than usual, a user should investigate why that is. OSSEC, an open source host-based intrusion detection system (HIDS), is an example of one system that can gather logs from AISA 10 via syslog and alert a user to log volume abnormalities.

Rule Methodology

Rules in AISA 10 are applied on a per-interface basis, and always in the inbound direction on that interface. Thus, traffic initiated from the LAN is analyzed using LAN interface rules. Traffic initiated from the Internet is analyzed with WAN interface rules. Because all rules in AISA 10 are stateful by default, a state table entry is created when traffic matches an allow rule. All reply traffic is automatically permitted by this state table entry.

The web server in AISA 10 provides a "Floating Rules" tab for the creation of outbound rules. Outbound rules are almost never required, because analyzing is applied on the inbound direction of every interface. However, in some limited circumstances such as an analyzing module with numerous internal interfaces, having outbound rules available can significantly reduce the number of required analyzing module rules. In such a case, egress rules for Internet traffic can also be applied as outbound rules on the WAN to avoid having to duplicate these rules for every internal interface.

Automatically Added Analyzing Module Rules

Anti-lockout Rule

To prevent locking a user out of the web interface, AISA 10 enables an anti-lockout rule by default. The anti-lock out rule is configurable on the System>Advanced page under Disable webConfigurator anti-lockout rule. This automatically added rule allows traffic from any source inside the industrial plant to the management daemons (SSH, HTTP, HTTPS) listening on the LAN IP of AISA 10.

In security-conscious environments, this automatically added rule should be disabled and the LAN rules should be configured so that only an alias of trusted hosts can access the administrative interfaces of the analyzing module.

Restricting Access to the Administrative Interface from LAN

To restrict access to the administrative interface from the LAN, the analyzing module rules should be configured to restrict access to the management interfaces. For example, in an industrial plant that uses both SSH and HTTPS for management, a ManagementPorts alias containing these ports can be created by the user. Then, an alias is created by the user for hosts and/or networks that will have access to the management interfaces. The user can then configure LAN analyzing module rules to allow access to the hosts and deny access to all else.

In one example, DNS queries to the LAN IP are allowed, but all other traffic is rejected. Or, for example, access from the management hosts to the management ports is allowed, and all other traffic to the management ports is rejected.

After the analyzing module rules are configured, the user checks the Disable webConfigurator anti-lockout rule on the System>Advanced page and clicks "Save."

If the user can no longer access the management interface after disabling the anti-lockout rule, the anti-lockout rule can be re-enabled by setting the Set LAN IP option at the console menu to its current IP.

Anti-spoofing Rules

AISA 10 uses an antispoof feature to block spoofed traffic and to provide Unicast Reverse Path Forwarding (uRPF) functionality as defined in RFC 3704. The analyzing module checks each packet against its routing table, and if a connection attempt comes from a source IP on an interface where the rules indicate that source does not reside, it is dropped. For example, traffic coming into the WAN port with a source IP of an internal network is dropped. Anything initiated on the internal network with a source IP that does not reside on the internal network is dropped.

Block Private Networks

The "Block Private Networks" option on the WAN interface automatically enters a block rule for RFC 1918 subnets. Unless there is a private IP space on the WAN, this option should be enabled to block traffic initiated on the WAN side. Hosts on private networks accessed from the LAN can still be accessed. A user can manually add a rule to block private networks on his or her OPT WAN interfaces by creating an alias containing the RFC 1918 subnets and adding an analyzing module rule to the top of the OPT WAN interface rules to block traffic with a source matching that alias.

Block Bogon Networks

Bogon networks are networks that should never be seen on the Internet, including networks with reserved and unassigned IP address space. The appearance of such networks indicates either spoofed traffic or an unused subnet that has been hijacked for malicious use. AISA 10 provides a bogons list that is updated as needed. If a user has enabled the Block bogon networks option, the analyzing module will fetch an updated bogons list on the first day of each month from a secure provider of such lists. This list does not change very frequently, and new IP assignments are removed from the bogons list months before they are actually used, so the monthly update is adequate. To confirm that the analyzing module can resolve DNS host names and thus allow this update to occur, the user can browse to Diagnostics>Ping and try to ping the secure provider.

IPsec

When a user enables a site-to-site IPsec connection, rules are automatically added to allow the remote tunnel endpoint IP address access to UDP port 500 and the ESP protocol on the WAN IP address used for the connection. When a mobile client's IPsec is enabled, UDP port 500 and ESP traffic is allowed from any source.

As a consequence of policy routing, any traffic that matches a rule specifying a gateway is forced out to the Internet, bypassing IPsec processing. When there is an allow rule specifying a gateway on an inside interface containing a subnet used by an IPsec connection and the destination of the rule is "any," the analyzing module automatically adds a rule to negate policy routing for traffic destined to the remote VPN subnet.

PPTP

When a user enables a PPTP server, hidden rules are automatically added allowing TCP port 1723 and the GRE (Generic Routing Encapsulation) protocol to the WAN IP address from any source IP address.

Default Deny Rule

Connections that do not match any user-defined rules nor any of the other automatically added rules are silently blocked by the default deny rule.

Other details for configuring analyzing module rules

Disabled

To disable a rule without removing it from the rule list, a user can check this box. The rule will show in the analyzing module rules screen, but the rule will be grayed out to indicate its disabled state.

Interface

The Interface drop down list specifies an interface on which a rule will be applied. Traffic is filtered only at the interface on which the traffic is initiated. Traffic initiated from the LAN destined to the Internet or any other interface on the analyzing module is filtered by the LAN ruleset.

Protocol

A user can specify a protocol that a rule will match. The TCP/UDP option matches both TCP and UDP traffic. The ICMP option causes another drop down box to appear where a user can select the ICMP type. Several other common protocols are also available in some embodiments.

Source

A user can enter a source IP address, subnet, or alias in a source field that matches a corresponding rule. The user may also check the "not" box to negate the match.

In the type field a user may specify "Any," which will match any address; "Single host or alias," which will match a single IP address/hostname or alias name; or "Network," which uses both an IP address and subnet mask to match a range of addresses. In some embodiments, several available presets are provided by AISA 10, namely, WAN address, WAN subnet, LAN address, LAN subnet, PPTP clients, L2TP clients, and PPPoE users.

For rules using TCP and/or UDP, the user may also specify a source port here by clicking the "Advanced" button. The source port is hidden behind the Advanced button in some embodiments because the user will normally want to leave the source port set to "any," as TCP and UDP connections are sourced from a random port in the ephemeral port range (between 1024 through 65535, the exact range used varying depending upon the OS and OS version that is initiating the connection). The source port is almost never the same as the destination port, and should never be configured as such unless the user knows the application he or she is using employs this atypical behavior. It is also safe to define the source port as a range from 1024 to 65535.

Destination

This field is where the user specifies a destination IP address, subnet, or alias that will match a rule. As with the source address setting, the user may select not to negate the match. In some embodiments, for rules specifying TCP and/or UDP, the destination port, port range, or alias is also specified here.

Log

Whether or not this box is checked determines whether or not packets that match this rule are logged to the analyzing module log.

Gateway

The gateway field allows a user to specify a WAN interface or load balancer pool for traffic matching this rule.

Description

A user may optionally enter a description in this field for future reference.

Viewing the Analyzing Module Logs

For each rule that is set to make a log entry, and for the default deny rule, a log entry is made. In some embodiments, a user may select one of several ways to view these log entries, with varying levels of detail.

Analyzing module logs keep only a certain number of records. If the needs of an organization require that the organization maintain a permanent record of analyzing module logs for a longer period of time, the logs can be copied to a syslog server as the records are generated.

Viewing in the WebGUI

In some embodiments, analyzing module logs are visible from the WebGUI and may be found on the analyzing module tab under Status>System Logs. A user can view either parsed logs, which are easier to read, or raw logs, which have more detail. There is also a setting which will show log entries in forward or reverse order.

In some embodiments, parsed WebGUI logs are shown by the webserver in 6 columns, namely, Action, Time, Interface, Source, Destination, and Protocol columns The "Action" column shows what happened to the packet which generated the log entry, namely, whether the packet was processed by a pass, block, or reject rule. The "Time" column displays the time that the packet arrived. The "Interface" column shows through which port the packet entered AISA 10. The "Source" column shows the source IP address and port. The "Destination" column shows the destination IP address and port. The "Protocol" column shows the protocol of the packet, for example, ICMP, TCP, UDP, etc.

The icon in the action column is a link which, when clicked, displays the rule that caused the log entry. This information can be used to troubleshoot rule entries. If the protocol is TCP, extra fields will be shown by the webserver that represent TCP flags present in the packet. These fields indicate various connection states or packet attributes. For example, "S" or "SYN" indicates synchronized sequence numbers. With this attribute, a new connection attempt is logged only when SYN is set. "A" or "ACK" indicates Acknowledgment of data. These acknowledgments are replies to let a sender know data was received OK. "F" or "FIN" indicates that there is no more data from a sender and that the connection was closed. "R" or "RST" indicates a connection reset. This flag is set when replying to a request to open a connection on a port that has no listening daemon. This flag can also be set by analyzing module software to turn away undesirable connections.

Viewing from the Console Menu

Raw logs may be viewed directly in real time from a logging interface. For example, "000000 rule 54/0(match): block in on vr1: 0.0.0.0.68>255.255.255.255.67: BOOTP/DHCP, Request [|bootp]"

shows that rule 54 (neither shown in the Figs. nor represented by numeral 54 in the Figs.) was matched, which resulted in a block action on the vr1 interface. The source and destination IP addresses are shown next. Packets from other protocols may show significantly more data.

Log entries for legitimate connections may sometimes be blocked and, in some embodiments of the present invention, logged. For example, a TCP FIN packet, which would normally close a connection, may arrive after the state of the connection has been removed because a packet was lost, and the retransmitted packet is blocked because the analyzing module has already closed the connection.

Troubleshooting Analyzing Module Rules

If analyzing module rules are not behaving as desired or as expected, a user should check the analyzing module logs (Status>System Logs, on the Analyzing Module tab). By default, some embodiments of AISA 10 log all dropped traffic and do not log any passed traffic. Unless "block" or "reject" rules that do not use logging are added, all blocked traffic will always be logged. In some configurations of the present invention, a red X is placed next to logged traffic in the analyzing module logs to indicate dropped traffic.

The user can edit rules and review parameters that have been entered for each field. The user can also review rule ordering, mindful that no rules past the first matching rule are evaluated.

Rules must be on the correct interface to function as intended, because traffic is filtered only by the ruleset configured on the interface from which the traffic is initiated. Traffic coming from a system on a LAN destined for a system on any other interface is filtered by only the LAN rules. The same is true for all other interfaces.

Enable Rule Logging

It can be helpful to determine which rule is matching selected traffic. By enabling logging on pass rules, a user can view analyzing module logs and click on an individual entry to determine which rule passed the traffic.

Packet captures can aid in troubleshooting and debugging traffic issues. For example, the user can determine from packet captures whether traffic is reaching the outside interface all or leaving the inside interface.

AISA 10 Industrial Analyzing Capabilities

Rules and Profiles

Industrial protocol rules and profiles are defined under the Analyzing Module>Industrial Protocols menu presented by the webserver. Rules match specific functions or actions within each industrial protocol. Profiles are groupings of rules, their actions (pass, block or log), and the default policy of block or pass for packets not matching any configured rules in the profile.

The three actions available for each rule are pass, log, and block. Log will pass the traffic and also create a log entry showing the traffic was passed.

Using Analysis to Configure Rules

Industrial analyzer rules can be configured using analysis functionality built into some embodiments of AISA 10. This analysis functionality allows a user to upload a packet capture of traffic for analysis and for adding rules specific to the traffic within the captured packet. If the packet captured contains only traffic that must be allowed, rules are added to pass that specific traffic and to block everything else. The analysis feature can be found under Analyzing Module>Industrial Protocols, on the Analysis tab.

Capturing Traffic for Analysis

Configurations of the present invention provide one or more options for capturing the traffic to be analyzed. For example, in one embodiment, AISA 10 offers built-in packet capture functionality under Diagnostics>Packet Capture. Traffic can also be captured from the host initiating the traffic for analysis using Wireshark or any other suitable packet capture tool.

Capturing Traffic from AISA 10

To capture traffic on AISA 10, a user first browses to Diagnostics>Packet Capture. The Interface selection chooses an interface that will be used to capture traffic and can be either the source or destination interface of the traffic.

The Host Address box allows a user to filter the capture to a specific IP address. For example, a user can specify the IP address of a specific PC or PLC to capture only traffic sourced from or destined to that IP address.

The Port box allows filtering to capture only a specified port, capturing both TCP and UDP traffic on that port. This filtering also excludes all protocols other than TCP and UDP.

The Packet Length field specifies the number of bytes of each packet that will be captured. In some embodiments, setting the packet link to "0" captures the entire frame for industrial protocol analysis.

The Count field specifies a number of packets after which the capture will automatically stop. For industrial protocol analysis, and in some configurations of the present invention, setting the count field to "0" will prevent the capture from stopping until the user clicks on the "Stop" button.

The Level of Detail and Reverse DNS Lookup fields are not applicable here and can be left unchanged.

The user clicks "Start" to begin the capture. The traffic to be analyzed is sent through and then the user clicks "Stop." The web server then presents the user with a "Download Capture" button. The user can click this button to download the resulting pcap file.

The user can then browse to Analyzing Module>Industrial Protocols, click the "Analysis" tab and the Browse button, choose the downloaded pcap file, and click "Upload File." AISA 10 then analyzes the pcap file to show a list of the types of commands sent across the session. The displayed analysis shows how many packets in the capture matched a user-selected, specific command.

Creating Rules

When a user clicks the "+" to the right of any individual line in the Analysis Results, AISA 10 adds a rule matching that specific type of traffic. The check boxes down the left side allow the user to select a plurality of entries to add a plurality of rules at once. After checking the desired items, the user can click the "+" at the very bottom of the screen to add the rules.

Rules can be configured based not only on packet analysis, but upon any other suitable properties as well, including source, destination, or the like. Thus, ingress traffic which passes the packet analysis requirements can be blocked nonetheless if it arrives from an unauthorized source, or if it is directed to an unauthorized destination.

Creating a Profile

A user can edit the profiles options and profile rules by clicking the profiles tab under Analyzing Module>Industrial Protocols.

The Profile Name is the name used to refer to the profile when a user configures analyzing module rules to assign traffic to this profile.

The Default action defines what the system will do with traffic that does not match any of the specified profile rules.

The Description field can be used to enter a comment helpful to the user.

The user can assign rules to the profile by clicking the "+" under "Profile rules."

Applying the Profile to Network Traffic

Now that a profile is defined, the user can specify what network traffic will be analyzed by the profile via analyzing module rules under the Analyzing Module>Rules screen presented by the web server. Traffic is filtered on the interface where it originates. In some embodiments, industrial protocol analyzing rules behave in the same as manner as other analyzing module rules in every aspect, with the exception that traffic matching a rule specifying an industrial protocol profile will pass only traffic matching the protocol configured in that profile. Hence, care must be taken to ensure the industrial protocol rules are not overly broad in applications in which many types of traffic are passed through the AISA 10.

In an example configuration, a plant floor network is connected to the LAN side of AISA 10, and the corporate network is connected to the WAN. The LAN side subnet is routed to the WAN IP of AISA 10 on the corporate network. All traffic from the corporate network to the plant network is routed through AISA 10. In this example, only the CIP traffic configured in a profile called "My-CIP" is permitted to get from the corporate network to the plant floor. Because the traffic is initiated on the WAN side of the AISA 10, a WAN analyzing module rule with this profile is created. The user creates a "CIPhosts" alias containing a list of IP addresses that are authorized to use CIP, as there is no need to permit every host to access CIP. The analyzing module rule thus created is:

Action: Pass Interface: WAN Protocol: TCP Source: CIPhosts alias Destination: any Destination port: 44818 Description: enter as desired Advanced option Industrial Protocol: My-CIP Allowing CIP only from the CIPhosts alias ensures traffic from unauthorized IP addresses that should not be trying to access the plant floor will be blocked. Thus, the Industrial Protocol profile ensures that only authorized actions are taken by authorized hosts.

A rule that specifies "pass" matches the defined industrial protocol analyzer. The actions of the industrial protocol profile are taken on traffic matching the rule. For example, the "My-CIP" profile permits only valid CIP traffic, specifically only actions defined in the rules within that profile. AISA 10 applies protocol enforcement regardless of the rules configured. For example, when defining a CIP profile in a rule, traffic matching that rule must be CIP rather than HTTP, SSH, or any other protocol.

In one example, a WAN ruleset is provided by a user. A first user-defined rule permits CIP from source IP addresses in a CIPhosts alias, as long as it matches the My-CIP profile. A second rule permits management access to AISA 10 from specifically authorized IP addresses, as defined in a ManagementHosts alias, so authorized staff can manage AISA 10 from the corporate network. The third rule allows pings to the WAN IP address for connectivity testing purposes.

Figure 17:
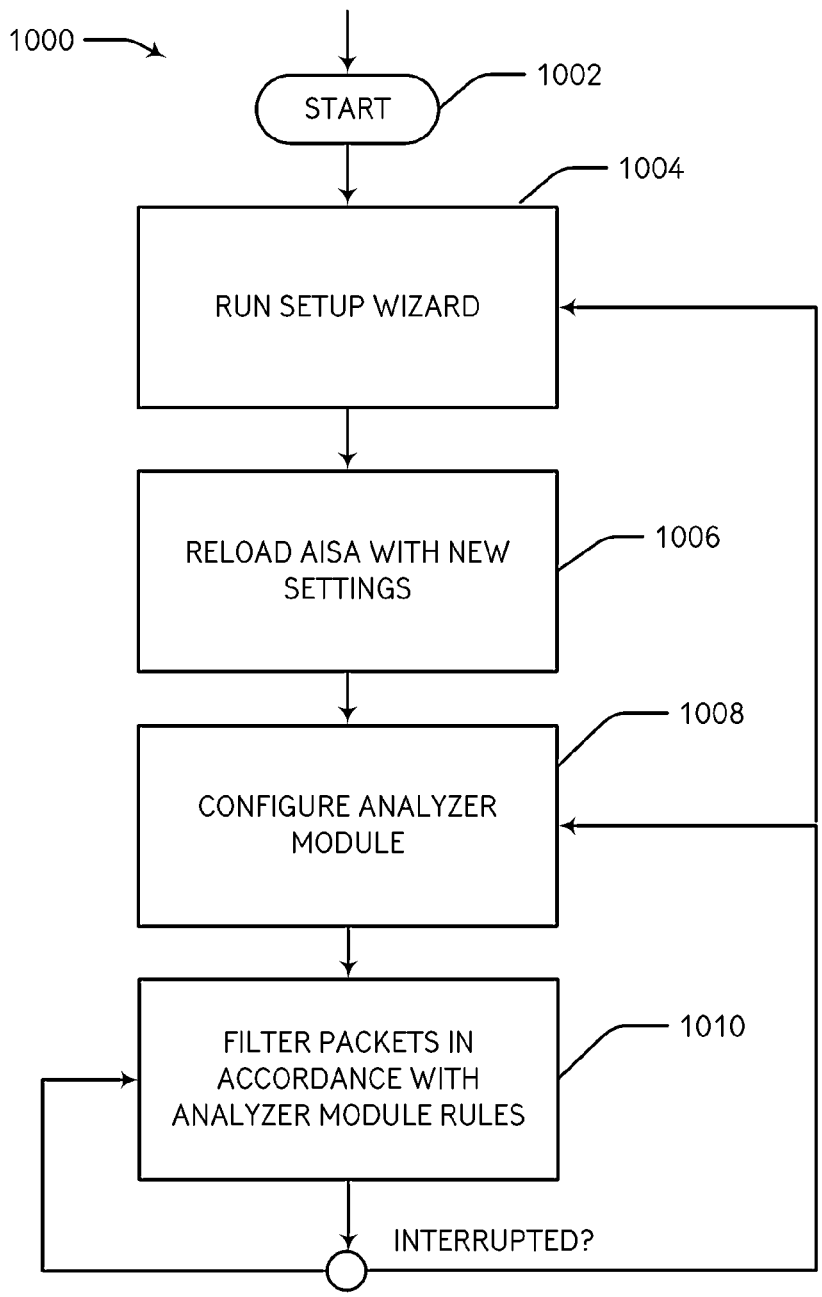
FIG. 17 is a flow chart showing the operation of an example embodiment of an AISA.

To summarize, some embodiments of the present invention include an AISA 10 that comprises one or more controllers 20, a memory 22, a WAN port 12, and a LAN port 14. Modules comprising at least controller 20 and parts of memory 22 (and optionally, additional memory connect to additional ports, such as USB port 26) include, referring to flow chart 1000 of FIG. 17, at least a setup wizard 1004 and an analyzing module configuration module 1008. When first turned on at 1002, AISA 10 runs the setup wizard at 1004 and reloads AISA 10 with new settings at 1006. AISA 10 then requests information to configure analyzing module 24 at 1008 from a user using a webserver that provides a GUI interface. After the analyzing module is configured at 1008, it can then repeatedly analyze packets in accordance with analyzing module rules at 1010 until it is interrupted to run the setup wizard again and/or reconfigure analyzing module 24. In some embodiments of the present invention, configuring the analyzing module further comprises configuring an industrial protocol ruleset (wherein the industrial protocol is a protocol that communicates with an industrial controller operating a machine), and analyzing the packets in accordance with analyzing module rules further comprises analyzing the packets in accordance with rules defined by the industrial protocol ruleset. Analyzing the packets in accordance with the rules defined by the industrial protocol ruleset may itself comprise a further parsing of the communication packet to recognize and determine at least a part of the content of objects embedded in industrial protocol packets, as it may be necessary to know the content of such objects to determine whether to pass or drop the communication packet. For example, this parsing of industrial protocol packets may be accomplished by the addition of extra code (".c" files) and definitions (".h" files) to the FreeBSD source code and recompiling and linking that code.

Figure 18A:
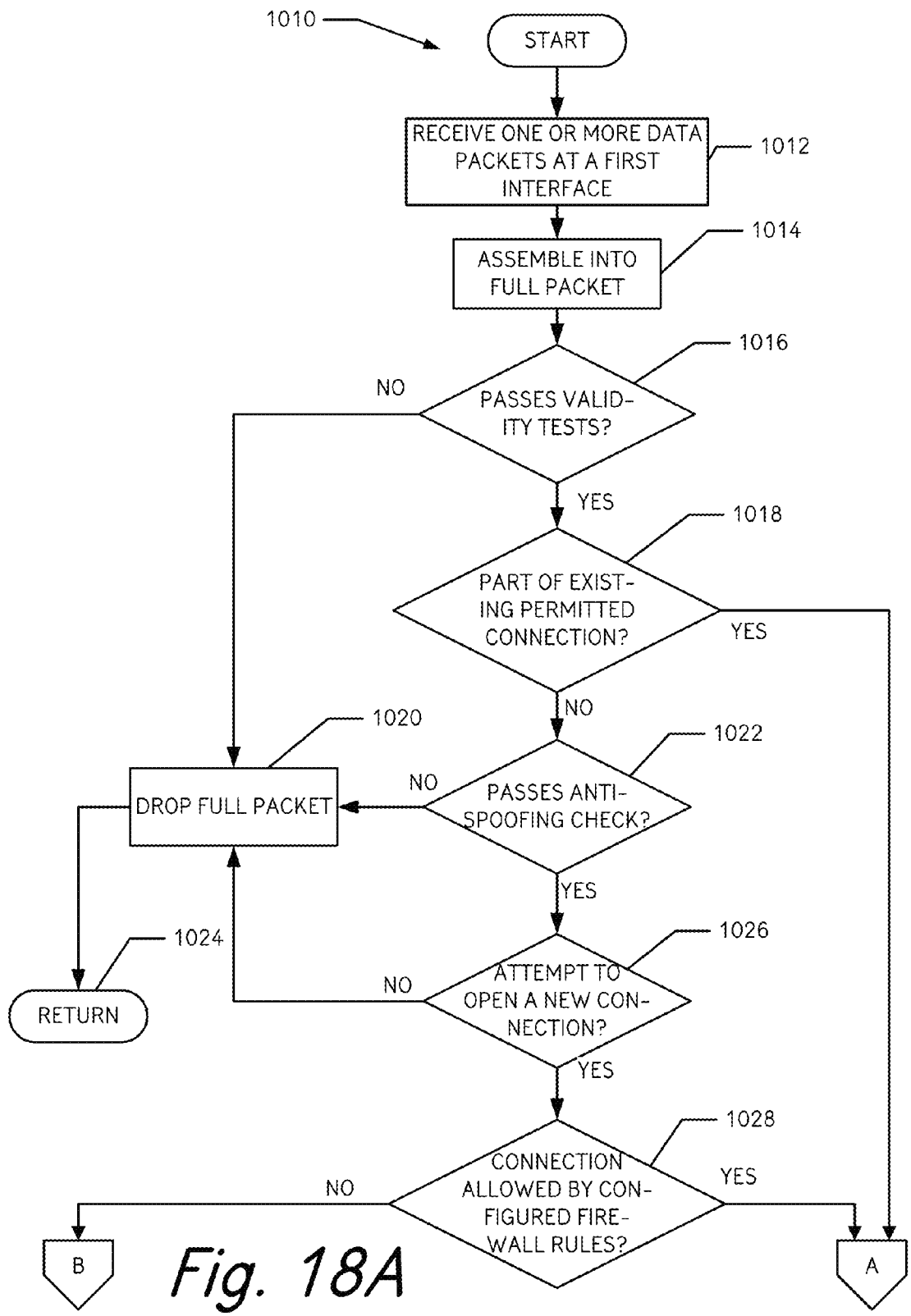
FIG. 18 is a flow chart showing more detail concerning the analyzing of rules.
Figure 18B:
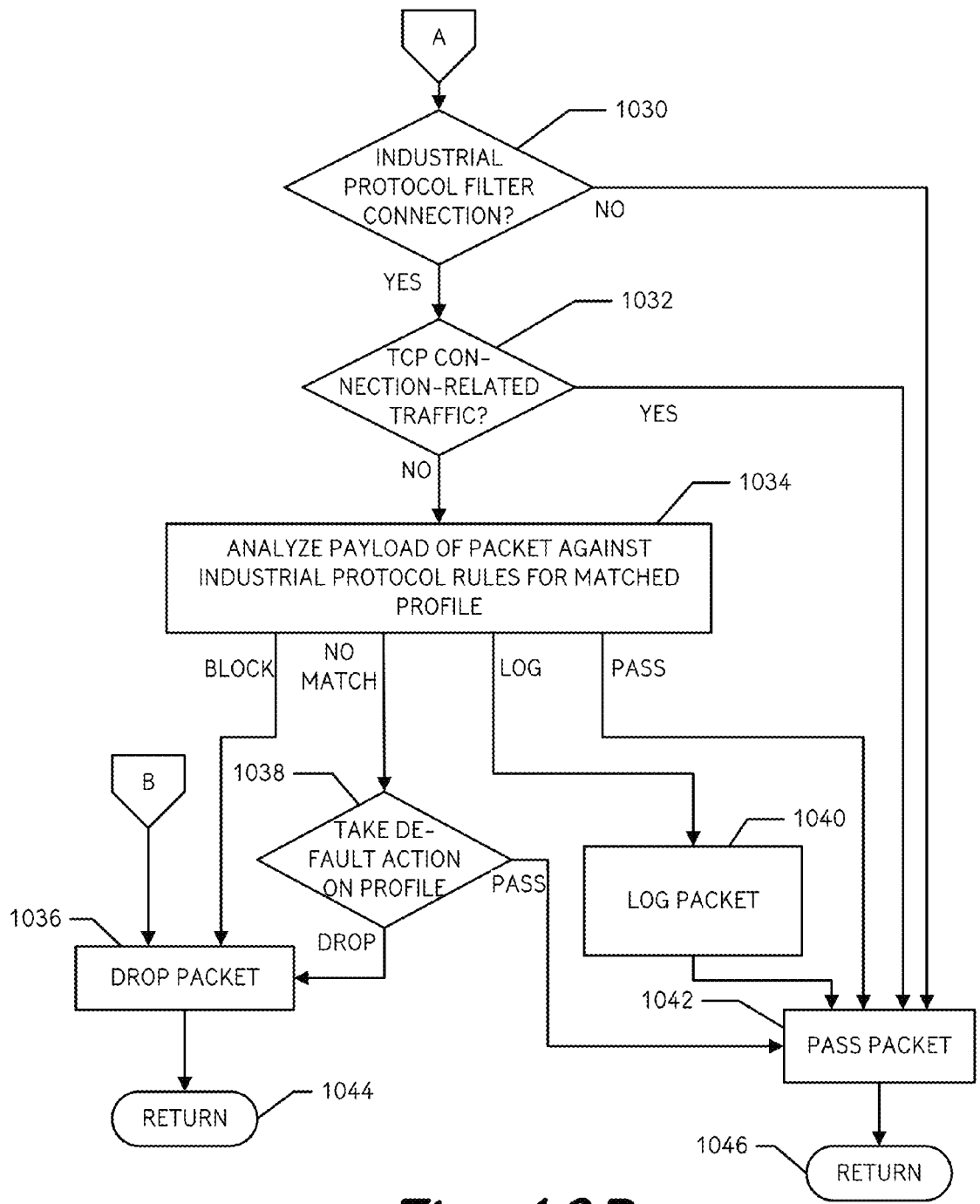

Thus, in some configurations of the present invention and referring to FIG. 18, analyzing packets in accordance with analyzing module rules in an analyzing rule module 1010 may further comprise, upon starting at 1011, receiving a packet at a first, or input, interface using a packet receiver module 1012 and "normalizing" the packet using a normalization module 1014. The term "normalization" as used herein refers to the reassembly of fragment packets so that each subsequent step within the analyzing rule module 1010 can be performed with the full packet available.

After a full packet is available from normalization module 1014, a validity test module 1016 determines whether the packet is valid. For example, in some embodiments, a validation of layer 3 and layer 4 protocols is performed, as well as tests for clearly invalid packets, such as those with impossible combinations of TCP flags, fragments with the DF (Don't Fragment) bit set, and/or other inconsistencies. If a packet is not valid, the packet is dropped at 1020, and the analyzing rule module 1010 returns to the calling module at 1024.

If the validity test module 1016 determines that a packet is valid, it passes the packet to an existing connection test module 1018. If existing connection test module 1018 determines that the packet is part of an existing permitted connection, the packet is passed to an industrial protocol analyzing module 1030, which is described in further detail below. Otherwise, the packet is passed to spoofing test module 1022. The anti-spoofing check ensures that the source, destination, and direction of the packet are sane according to a routing table, with a uRPF (Unicast Reverse Path Forwarding) check. A non-exhaustive list of tests may include, for example, blocking traffic coming into the first interface port or WAN sourced from a second interface port or LAN IP address, blocking anything into the LAN with a source IP other than the LAN network and any other networks reachable by the LAN. If the packet fails the spoofing test (i.e., it is a spoofed packet), it is dropped at 1020 as a spoofed packet and analyzing rule module 1010 returns to the calling module at 1024. Otherwise the packet is checked by a new connection test module 1026 to determine whether the packet is an attempt to open a new connection. If the packet fails the new connection test, it is dropped at 1020 as an invalid packet and analyzing rule module 1010 returns to the calling module at 1024.

If the packet passes the new connection test of connection test module 1026, it is then tested by connection test module 1028 to determine whether the new connection is allowed by the configured firewall ruleset memory. If not, the packet is dropped at 1036 and analyzing rule module 1010 returns to the calling module at 1044. Otherwise, the packet is passed to industrial protocol analyzer test module 1030. Connection test module 1026 may include a test for a SYN flag in a TCP connection.

If existing connection test module 1018 determines that the packet is part of an existing permitted connection, or if connection test module 1028 determines that the packet is allowed by the industrial protocol analyzing rules, industrial protocol analyzer test module 1030 then determines whether the packet is part of an industrial protocol analyzer connection. If the packet is not part of an industrial protocol analyzer connection, industrial protocol analyzing module 1030 passes the packet to a second, output interface at 1042 and returns to the calling module at 1046. (As used herein, "passing the packet to a second interface" need not require that a full packet be sent to another device via the output interface, although this action need not be forbidden by embodiments of the present invention. Rather, "passing the packet to a second interface" as used herein only requires that an indication of the contents of the packet [e.g., the payload of the packet] be communicated via the second interface.) Otherwise, industrial analyzing is performed, starting, in the example embodiment of FIG. 18, at TCP traffic test module 1032. TCP traffic test module 1032 determines whether the packet under test is related to TCP connectivity. A non-exhaustive list of such packets include an initial TCP handshake and the eventual closure of a TCP session. If so, the packet (or an indication thereof, which may include the packet itself) is passed to an industrial controller via second interface 1042. Analyzing rule module 1010 then returns to the calling module at 1046. If the packet is not TCP connection-related traffic, the packet is next analyzed by payload analyzer module 1034, which analyzes the payload of the packet against industrial protocol rules for a matched profile. For example, if the matching profile indicates that the traffic must be CIP (Common Industrial Protocol), then the traffic must be CIP traffic.

The protocol analysis performed by protocol analyzer module 1034 can produce one of (at least) four results in the illustrated embodiment, namely, "block," "no match," "log," and "pass." If the results of the analysis from payload analyzer module 1034 indicate that the packet should be blocked, the packet is dropped at 1036 and analyzing rule module 1010 returns to the calling module at 1044. If there is no match for the packet, the default action of the profile for the packet under test is determined by a default action module 1038, and the packet is dropped at 1036 or passed at 1042, in accordance with the default action to be taken for the packet by the profile. If the analysis from the payload analyzer module 1034 indicates that the packet should be passed and logged, the packet is also logged by a logging module at 1040 and passed at 1042. If the analysis indicates that the packet should be passed without logging, the packet is passed at 1042 without logging. Whether the packet is dropped at 1036 or passed at 1042, the analyzing rule module 1010 then returns to the calling module at either 1044 or 1046, respectively.

Embodiments of the present invention may utilize a software operating system known as FreeBSD, however, configurations are not limited to any particular operating system. Configurations of the present invention may be realized in embedded systems utilizing for example, a 1.6 GB Intel® Atom™ processor and 2 GB of RAM with a 32 GB solid state hard drive. Such embodiments are thus entirely free of electromagnetic components and moving parts. These embodiments may be located as desired with SCADA remote connectivity, including down on a plant floor in its own level environment.

Some embodiments of the present invention utilize a feature of the BSD operating system known as "divert sockets." The BSD operating system is very good at parsing packets and assembling packets. In one embodiment of the present invention, definitions are added to the FreeBSD kernel so that the kernel can understand and parse six different industrial protocols. The exact number of industrial protocols that can be understood and parsed is not limited to any specific number, such as six. However, appropriate definitions can be added to understand an arbitrary number of industrial protocols.

As data arrives, the BSD kernel parses the industrial protocols and assembles the data into a payload. An engine receives the payload, and one or more analyzers within the engine read the actual contents of the payload. In this manner, the command sequences are determined. The open source program "WIRESHARK" is used in some embodiments to capture packets. Thus, the arriving data stream can be collected in a PCAP at various PLCs and dropped into a packet analyzer engine, or the packet analyzer engine can be operated in a bridge mode to capture packets during a cycle time. For example, PLC "reads" and "writes" may occur at a frequency of 10 per second, while a process that collects the history of the industrial automation system may request information only once every 12 hours. The cycle time is as long as the longest intervals between requests, in this case, 12 hours. By operating during an entire cycle time, every instance of industrial protocol type is captured, along with each source and destination. The packet analyzer engine can thus verify packets are being transferred from the correct sources to the correct destinations.

In one embodiment of the present invention, the packet analyzer engine generates a ruleset to verify the correct transfer of packets. This ruleset is made part of a group policy that is incorporated into an analyzing module, wherein previously existing rules may be completely turned off or deleted. Thus, nothing can enter the industrial automation system unless it exactly matches a rule in the group policy ruleset. The group policy serves as a whitelist for packets, which is considerably more effective than a blacklist in that only known good packets are allowed. Packets not on the whitelist are discarded if they are from an incorrect source, even if they contain known good commands. Likewise, packets not on the whitelist will be discarded even if they are from a correct source, yet they contain incorrect commands. The rejected packets are logged in some configurations of the present invention. Thus, even if Stuxnet were brought into a plant, the worm would never get to the industrial controllers and thus never bring down the plant.

Figure 19A:
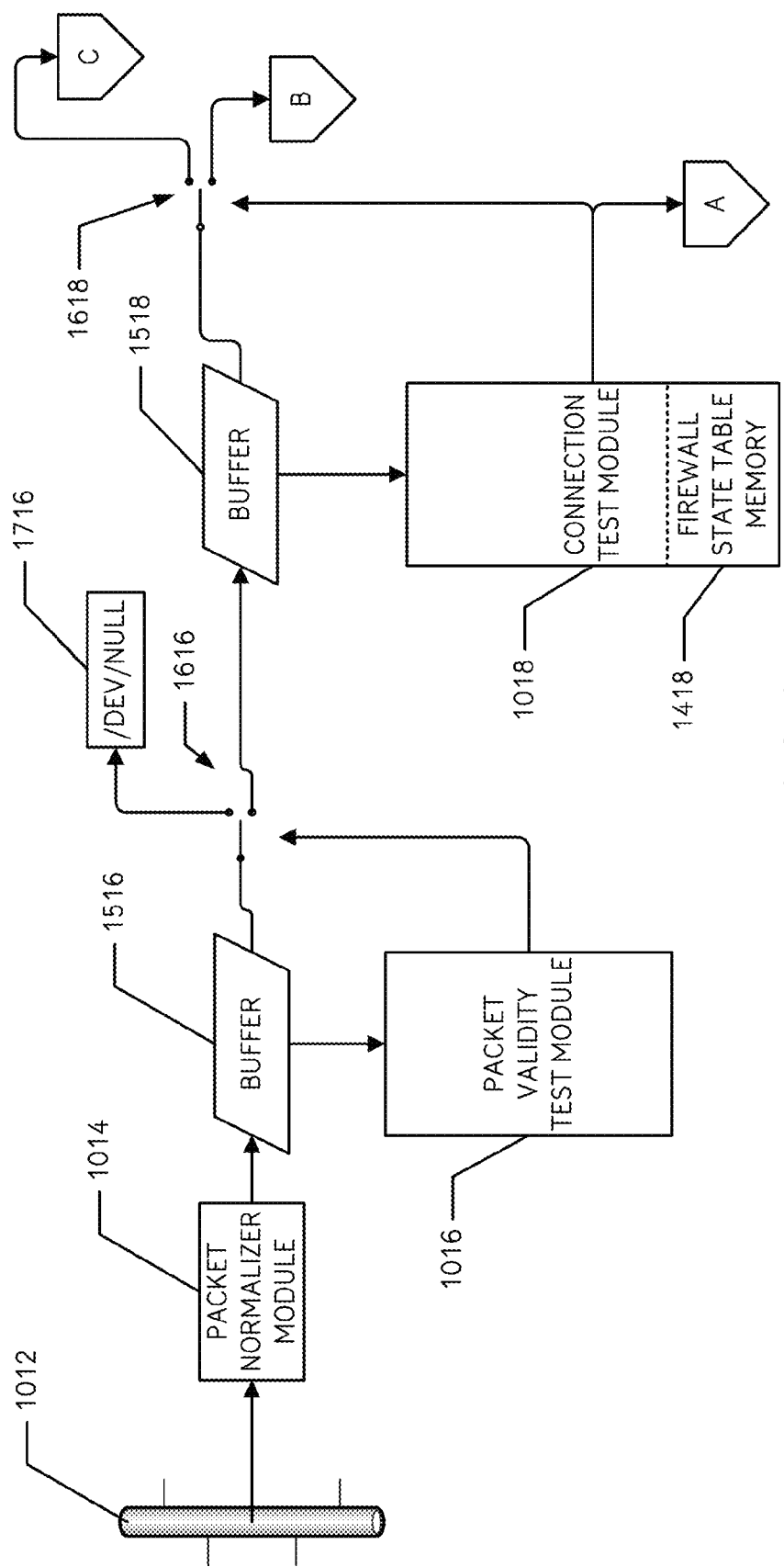
FIG. 19 is a schematic block diagram of one example embodiment of the present invention.
Figure 19B:
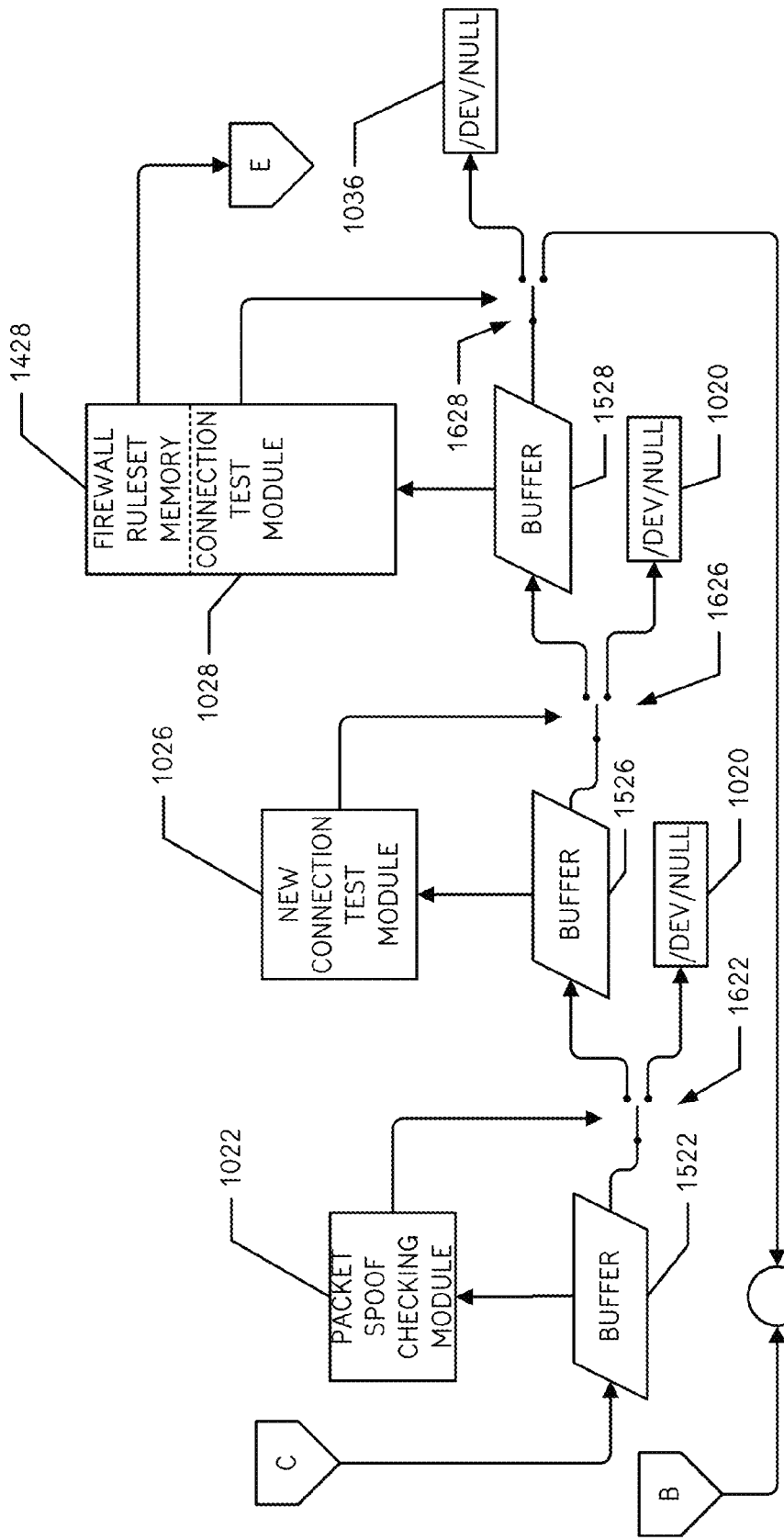
Figure 19C:
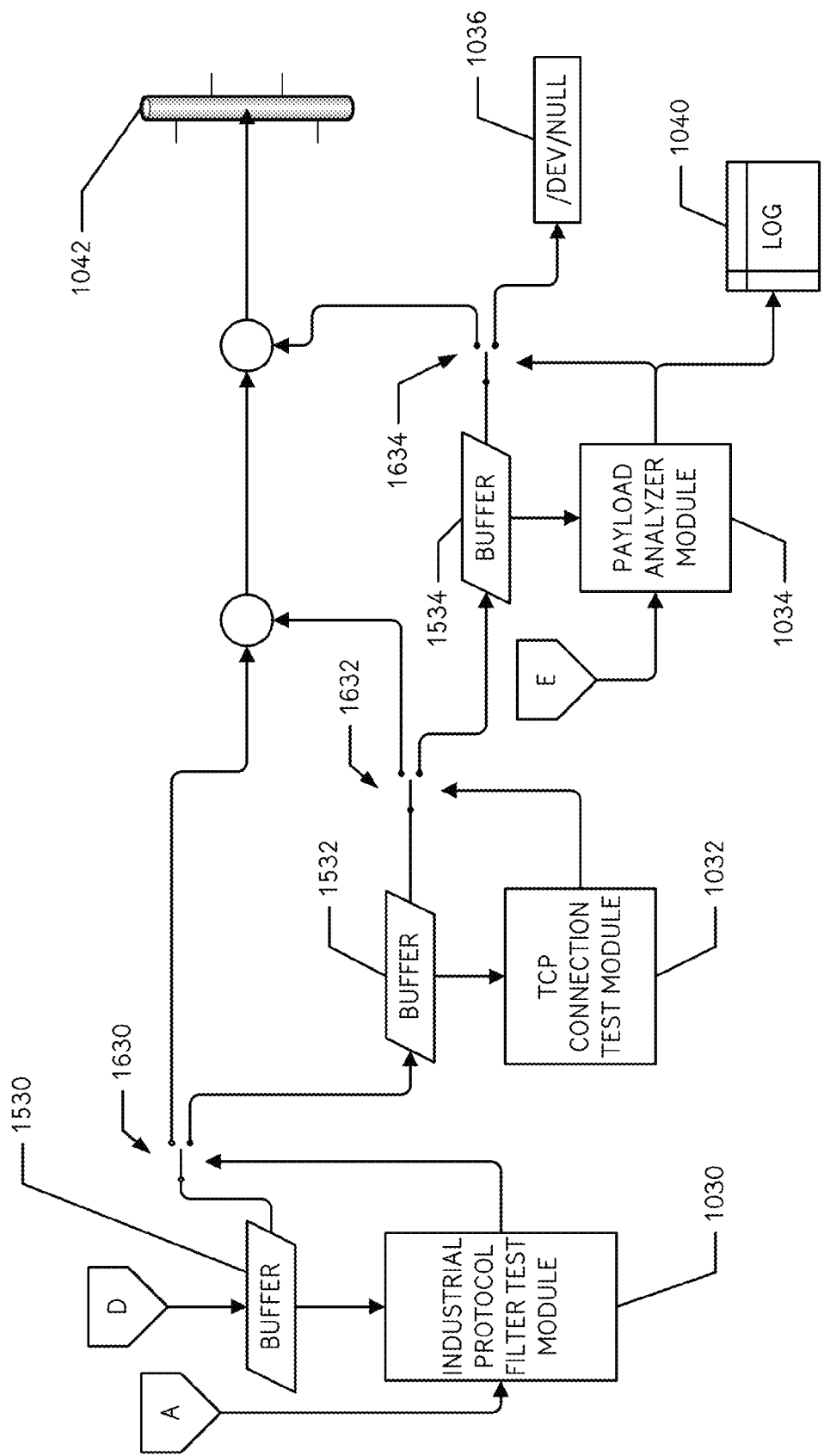

Referring now to the schematic block diagram of a packet analyzer apparatus of FIG. 19, some embodiments of the present invention receive packets via a first interface 1012. The packet analyzer apparatus can include a packet normalizer module 1014, which reassembles fragment packets received via first interface 1012. In the embodiment illustrated in FIG. 19, packets (or fully assembled packets) are buffered by separate buffers, such as buffer 1516, after having been checked or operated upon by a module. However, the choice of whether to hold packets in a plurality of buffers or in just one buffer (e.g., a location corresponding to a variable or data structure in RAM memory) is not material to the practicing of the present invention and can be left as a decision to be made by a circuit designer and/or computer programmer having ordinary skill in the art.

Once a normalized packet is available in buffer 1516, a packet validity test module 1016 determines whether the packet is valid. If it is not, a switch 1616 (which can be an electronically-controlled switch or just software or firmware program logic) directs the packet to a "bit bucket," such as /dev/null 1716. (A "bit bucket" is not necessarily a physical device or file, but merely indicates that data "entering" the bit bucket is discarded or erased. Thus, the several /dev/null blocks shown in FIG. 19 do not necessarily represent different devices or files.)

If the packet tested by packet validity test module 16 is valid, it is sent via switch 1616 to buffer 1518 and is then tested by existing connection test module 1018. Existing connection test module 1018 includes a firewall state table memory 1418 that contains indications of permitted existing connections and an indication of whether a full packet of each existing permitted connection should contain a payload. Existing connection test module 1018 indicates whether the packet in buffer 1518 is part of an existing connection and whether the packet in buffer 1518 contains a payload. If the packet in buffer 1518 is not part of an existing connection, it is passed to buffer 1522, otherwise, it is passed to buffer 1530.

If the packet has been passed to buffer 1522, it is checked by a packet spoof checking module 1022. If the packet is spoofed, it is dropped to /dev/null 1020 by switch 1622. Otherwise, the packet is passed to buffer 1526, where it is checked by new connection module 1026. If the packet in buffer 1526 is not an attempt to open a new connection, switch 1626 is set by new connection module 1026 to send the packet to /dev/null 1020. Otherwise, the packet in buffer 1526 is sent to buffer 1528. The packet in buffer 1528 is tested by connection test module 1028 to determine whether the new connection is allowed by configured firewall rules in firewall ruleset memory 1428. If not, switch 1628 is set so that the packet in buffer 1528 is dropped at /dev/null 1036 (where the reference numeral is selected to correspond with a corresponding portion of the flow chart of FIG. 18). Otherwise, the packet in buffer 1528 is passed to buffer 1530.

A packet in buffer 1530, whether from buffer 1518 or from buffer 1528, is tested by industrial protocol analyzer test module 1030 to determine whether the packet is part of an industrial protocol analyzer connection. If the packet in buffer 1530 is not part of an industrial protocol analyzer connection, switch 1630 is set to pass the packet to an industrial interface controller (not shown in FIG. 19) via second interface port 1042. Otherwise, industrial analyzing is performed, starting by passing the packet in buffer 1530 to buffer 1532 using switch 1630. The packet in buffer 1532 is tested by TCP connection test module 1032 to determine whether the packet under test is related to TCP connectivity. If so, switch 1632 passes the packet in buffer 1532 to second interface port 1042. Otherwise, switch 1632 passes the packet in buffer 1532 to buffer 1534.

A packet in buffer 1534 is tested by payload analyzer module 1034 to analyzer the payload of the packet in buffer 1534 against industrial rules for a protocol matched in firewall ruleset memory 1428. One of (at least) four results can be produced. If the results of the analysis of payload analyzer module 1034 indicates that the packet in buffer 1534 should be blocked, switch 1634 is set to send the packet to /dev/null 1036. If there is no match for the packet, a default action module (which, in the embodiment illustrated in FIG. 19, is part of payload analyzer 1034) switch 1634 is set to perform the default action, which may be drop the packet in buffer 1534 into /dev/null 1036 or to pass the packet to second interface port 1042. If the analysis by payload analyzer module 1034 indicates that the packet in buffer 1534 should be passed and logged, switch 1634 is set to pass the packet to second interface port 1042 and an indication of the packet (which may be the packet itself) is logged by logging module 1040.

In some embodiments of the present invention, code that implements intrusion prevention is embedded in a memory 22 of AISA 10. However, the code may be provided on a tangible object that can be transferred to AISA 10 and/or that can operate, for example, a general purpose computer or workstation, or a differently configured workstation. For example, the code may be provided in computer-readable form on non-volatile memory. Such memory can include, for example, a thumb drive, a ROM, or a magnetic or optical disk.

Figure 20:
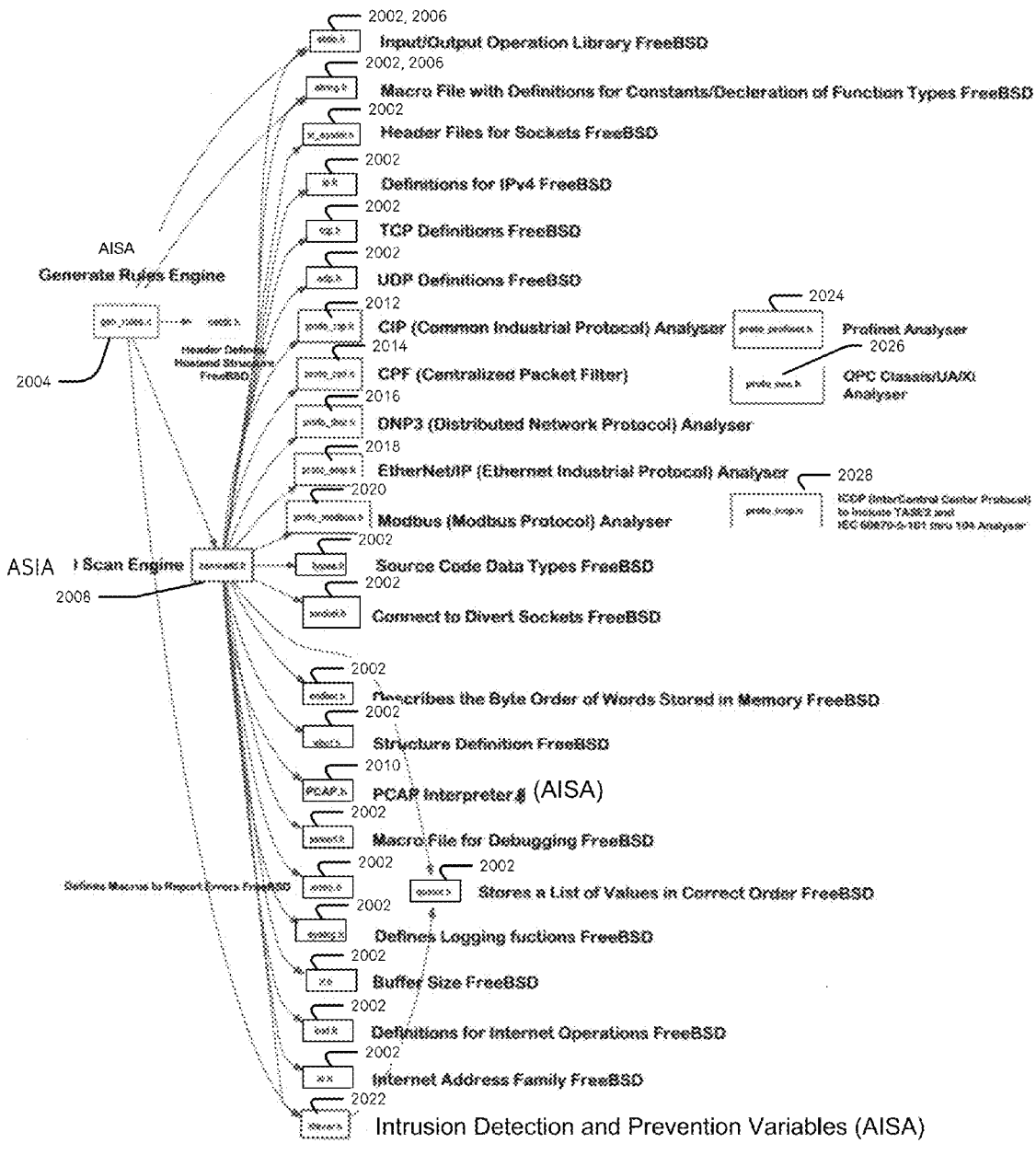
FIG. 20 is a software architecture block diagram illustrating the structure of software used in one embodiment of the present invention.

In some embodiments and referring to FIG. 20, AISA 10 software may be implemented using the FreeBSD operating system. Some of the code header files (".h" files) 2002 that are already supplied as part of the FreeBSD operating system are also shown in FIG. 19. An AISA rule generating engine 2004 (in this example, gen_rules.c) interfaces directly with a few FreeBSD operating system header files 2006 and with an AISA scan engine 2008 (in this example, "zenwalld.h). AISA scan engine 2008 interfaces directly with each of the header files 2002 shown in FIG. 19, including PCAP.h 2010, an interpreter module provided with AISA scan engine 2008, as well as AISA-provided header files proto_cip.h 2012, proto_cpf.h 2014, proto_dnp.h 2016, proto_enip.h 2018, proto_modbus.h 2020, and idsvar.h 2022. (It will be understood that the names of these modules may be different in different embodiments of the present invention.) CIP analyzer 2012 may include, for example, a PROFINET analyser 2024. Centralized packet analyzer 2014 may also include an OCP Classis/UA/Xi analyzer 2026. Modbus analyzer 2020 may include an ICCP (InterControl Center Protocol) analyzer 2028. It will be understood that this software architecture applies to some embodiments that rely upon the FreeBSD operating system, and that other embodiments relying upon this or other operating systems may have somewhat different architectures, including many that can be derived from FIG. 19 by one skilled in the art.

It should be understood that, while embodiments of the invention dealing with industrial protocols are described herein, other embodiments of the invention can deal with any other suitable protocol or combination of protocols. The use of the term "special protocol" in the claims below is therefore meant, unless otherwise limited, should thus be interpreted as encompassing not only industrial protocols but other types of suitable protocols as well. Moreover, although embodiments of the invention described herein deal with Ethernet packets, it should be readily apparent that some embodiments of the present invention may also deal with other types of packets, such as serial packets.

It should further be understood that the protocol analyzer described herein can be used to analyze network traffic before the traffic is then filtered. In one example, network traffic can first be analyzed by the protocol analyzer described herein, and then the traffic can then be filtered as described in U.S.

patent application Ser. No. 13/019,618, the entire disclosure of which is hereby incorporated by reference.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A protocol analyzer apparatus comprising:
   (a) a first interface port configured to receive one or more unencrypted data packets, said one or more data packets each comprising a full packet that may include a payload,
   (b) a second interface port configured to transmit data that may include said payload;
   (c) a connection test module comprising a firewall state table memory analyzing and indicating permitted existing connections and an indication of whether said full packet of each said existing permitted connection contains a payload, said connection test module configured to indicate whether said full packet is part of a said existing connection and whether said full packet contains a payload;
   (d) a special protocol analyzer test module comprising at least one protocol ruleset, said special protocol analyzer test module configured to parse and analyze the one or more data packets, in accordance with the at least one protocol ruleset to examine for recognized content objects embedded in said one or more data packets; and
   wherein the one or more data packets including the payload are dropped if the examined content objects do not match a protocol listed in the at least one protocol ruleset, or said one or more data packets are allowed to be transmitted through said second interface port if the examined content objects match a protocol listed in the at least one protocol ruleset.

2. The apparatus in accordance with claim 1 further comprising a TCP connection test module configured to allow said second interface port to transmit data when the content objects match a protocol listed in said at least one protocol ruleset.

3. The apparatus in accordance with claim 1 further comprising a packet normalizer module configured to assemble said one or more data packets into said full packet when said one or more data packets comprise more than one data packet.

4. The apparatus in accordance with claim 1 further comprising a data packet spoof checking module configured to prevent said second interface port from transmitting data related to said full packet when said full packet is a spoofed packet and not part of an existing permitted connection.

5. The apparatus in accordance with claim 4 further comprising
   a firewall ruleset memory having at least one firewall connection ruleset and a connection firewall module and wherein (a) said firewall ruleset memory is configurable with the at least one firewall connection ruleset to indicate whether the full packet attempting to open a new connection should be blocked, does not match said at least one firewall connection ruleset, or is allowed and has a corresponding special protocol profile,
   (b) said firewall connection module configured to (1) prevent said second interface port from transmitting data related to said full packet when said firewall ruleset memory indicates that said full packet attempting to open a new connection should be blocked or does not match the at least one firewall connection ruleset, and to
   (2) prevent said special protocol analyzer test module from testing said full packet, and
   (c) said firewall connection module further configured to allow said special protocol analyzer test module to test said full packet when said full packet is attempting to open a new connection and said firewall ruleset memory indicates that said full packet is allowed and said content objects match a protocol listed in the at least one protocol ruleset.

6. The apparatus in accordance with claim 5 wherein said firewall ruleset memory is further configurable with indications of an at least one special protocol profile for corresponding with said at least one firewall connection ruleset, each said at least one special protocol profile configurable with the at least one protocol ruleset; and
   said protocol analyzer apparatus further comprising a payload analyzer module configured to (a) permit or disallow said second interface to transmit data related to said full packet, and (b) to log or not to log an indication of said packet, dependent upon a corresponding special protocol profile and said rule corresponding to payloads.

7. The apparatus in accordance with claim 1 further comprising a new connection analyzer configured to prevent said second interface port from transmitting data related to said full packet when said full packet is neither part of an existing connection nor an attempt to open a new connection.

8. A method for electronically analyzing network traffic, said method comprising:
   (a) providing a first interface port;
   (b) receiving one or more unencrypted data packets via a first interface port, said one or more data packets comprising a full packet that may include a payload;
   (c) providing a second interface port configured to transmit data that may include said payload;
   (d) providing at least one special protocol ruleset;
   (e) providing at least one pre-determined ruleset of permitted connections;
   (f) determining and analyzing whether said full packet is part of an existing permitted connection from the at least one pre-determined ruleset of permitted connections, and if so, determining and analyzing whether said full packet contains a payload; and
   examining the payload if present for recognized content objects embedded in said one or more data packets;
   (g) matching examined content objects against the special protocol ruleset;
   (h) transmitting data indicative of said full packet via said second interface port to a machine controller if the full packet of said existing permitted connection contains content objects matching the special protocol ruleset; and
   (i) dropping and logging any connection that falls outside the pre-determined ruleset of connections to be permitted.

9. The method in accordance with claim 8 further comprising:
   transmitting said data indicative of said full packet via said second interface port when the one or more data packets contain content objects matching the special protocol ruleset.

10. The method in accordance with claim 8 further comprising assembling said one or more data packets into said full packet when said one or more data packets comprise more than one data packet.

11. The method in accordance with claim 8 performed only when said full packet is determined to be valid.

12. The method in accordance with claim 8 further comprising preventing said second interface port form transmitting data related to said full packet when said full packet is a spoofed packet and not part of an existing permitted connection.

13. The method in accordance with claim 8 further comprising: preventing said second interface port from transmitting data related to said full packet when said full packet is neither part of an existing connection nor an attempt to open a new connection.

14. The method in accordance with claim 13 further comprising:
   (a) providing one or more firewall rulesets to govern the management of said new connection, or said existing connection,
   (b) preventing said second interface port from transmitting data related to said full packet when said full packet attempting to open a new connection is blocked by said one or more firewall rulesets or has no match to said one or more firewall rulesets, and
   (c) transmitting data related to said full packet when said full packet attempting to open a new connection contains content objects matching the special protocol ruleset and is neither blocked by said one or more firewall rulesets, nor has no matching to said one or more firewall rulesets.

15. The method in accordance with claim 14 wherein, when said full packet received from a connection not listed on the at least one pre-determined ruleset of permitted connections content objects that do not match the special protocol ruleset:
   transmitting or disallowing transmitting, via said second interface, data relating to said full packet, and logging an indication of said packet, when said data related to said full packet is transmitted, in accordance with the special protocol ruleset.

16. The method in accordance with claim 14 further comprising:
   providing means for detecting and receiving a connection from a source not listed on the pre-determined ruleset of permitted connections.

17. A non-volatile, non-transitory machine readable memory having a recorded thereon instruction configured to instruct an apparatus having a process, a first interface port, configured to receive one or more unencrypted data packets, said one or more data packets comprising a full packet that may include a payload, a second interface port configured to transmit data that may include said payload to an industrial machine control, and additional memory to:
   (a) receive one or more data packets via a first interface port, said one or more data packets comprising a full packet that may include a payload,
   (b) determine whether said full data packet is part of an existing permitted connection, and if so, determine whether said full packet contains content objects which matches a special protocol ruleset; and
   (c) if the full packet of said existing permitted connection does contain content objects matching the special protocol ruleset, transmit data indicative of said full packet via said second interface port to an industrial machine controller.

18. The non-volatile, non-transitory machine readable memory in accordance with claim 17 wherein said instructions further comprise instructions configured to prevent said second interface port from transmitting data related to said full packet when said full packet is neither part of an existing connection nor an attempt to open a new connection.

19. The non-volatile, non-transitory machine readable memory in accordance with claim 18 wherein said instructions further comprise instructions configured to:
   (a) prevent said second interface port from transmitting data related to said full packet when said full packet attempting to open a new connection is blocked by a firewall rule or has no matching firewall rule, and
   (b) transmit data related to said full packet when said full packet attempting to open a new connection has content objects matching the special protocol ruleset and is neither blocked by a firewall rule nor has no matching firewall rule.

20. The non-volatile, machine-readable memory in accordance with claim 18 wherein said instructions further comprise: instructions configured to, when said full packet attempting to open a new connection has a payload:
   (a) transmit or disallow transmitting, via said second interface, data related to said full packet in accordance with said special protocol ruleset, and
   (b) log an indication of said packet when said data related to said full packet is transmitted, in accordance with said special protocol ruleset.

\* \* \* \* \*